US011356013B2

(12) United States Patent
Geske et al.

(10) Patent No.: US 11,356,013 B2
(45) Date of Patent: Jun. 7, 2022

(54) METHOD OF SHORT-CIRCUITING A FAULTY CONVERTER SUBMODULE AND POWER CONVERTER SUPPORTING SAME

(71) Applicant: GE Energy Power Conversion Technology Ltd., Warwickshire (GB)

(72) Inventors: Martin Geske, Potsdam (DE); Hendrik Gloes, Berlin (DE); Varun Raghunath, Berlin (DE)

(73) Assignee: GE Energy Power Conversion Technology Ltd., Warwickshire (GB)

( * ) Notice: Subject to any disclaimer, the term of this patent is extended or adjusted under 35 U.S.C. 154(b) by 0 days.

(21) Appl. No.: 17/174,825

(22) Filed: Feb. 12, 2021

(65) Prior Publication Data

US 2021/0249947 A1 Aug. 12, 2021

(30) Foreign Application Priority Data

Feb. 12, 2020 (EP) ..................................... 20156889

(51) Int. Cl.
*H02M 1/32* (2007.01)
*H02H 7/12* (2006.01)
(Continued)

(52) U.S. Cl.
CPC ............... *H02M 1/32* (2013.01); *H02H 7/12* (2013.01); *H02H 9/041* (2013.01); *H02M 7/219* (2013.01);
(Continued)

(58) Field of Classification Search
CPC .... H02M 7/219; H02M 7/483; H02M 7/4835; H02M 1/0054; H02M 1/32; H02M 1/325; H02H 9/041; H02H 7/12
(Continued)

(56) References Cited

U.S. PATENT DOCUMENTS

| 8,942,014 B2* | 1/2015 | Norrga | B60L 15/007 363/68 |
| 9,806,599 B2* | 10/2017 | Geske | H02H 9/041 |
| 10,367,407 B2* | 7/2019 | Geske | H02M 7/757 |

FOREIGN PATENT DOCUMENTS

JP 2006042563 A 2/2006

OTHER PUBLICATIONS

European Search Report from EP Appl. No. 20156889 dated Aug. 21, 2020, 8 pages.

\* cited by examiner

*Primary Examiner* — Yemane Mehari
(74) *Attorney, Agent, or Firm* — Wood IP LLC

(57) ABSTRACT

A method of short-circuiting a faulty submodule for a voltage-source power converter is disclosed. The submodule is based on a full-bridge, asymmetric full-bridge or half-bridge circuit design having power semiconductor switches with anti-parallel freewheeling diodes and optionally non-controllable semiconductor valves. The method 36 includes identifying a faulty semiconductor device and determining a failure mode selected from a short-circuit failure mode and an open circuit failure mode. The method further includes selecting a minimum number of power semiconductor switches suitable to provide a bypass path through the submodule depending on the identified faulty semiconductor device and the determined failure mode and driving the selected power semiconductor switches by a modified driving voltage compared to normal operation to cause them to break down in order to provide a durable, stable, low impedance short-circuit path between the AC voltage terminals of the submodule. A power converter comprising a series connection of such submodules and supporting the method of short-circuiting a faulty submodule is also disclosed.

16 Claims, 10 Drawing Sheets

(51) Int. Cl.
*H02H 9/04* (2006.01)
*H02M 7/219* (2006.01)
*H02M 7/483* (2007.01)
*H02M 1/00* (2006.01)

(52) U.S. Cl.
CPC .......... *H02M 7/483* (2013.01); *H02M 1/0054* (2021.05); *H02M 1/325* (2021.05); *H02M 7/4835* (2021.05)

(58) Field of Classification Search
USPC .......................................................... 361/18
See application file for complete search history.

METHOD OF SHORT-CIRCUITING A FAULTY CONVERTER SUBMODULE AND POWER CONVERTER SUPPORTING SAME

The present invention relates to a method of short-circuiting a faulty converter submodule and a power converter including a plurality of submodules connected in series and supporting such a method.

Power converters for converting electrical energy, for power factor compensation and for many other purposes are frequently built of submodules that have a bridge circuit with controllable power semiconductor switches and an internal capacitor for the temporary storage of electrical energy, which forms a DC intermediate circuit. The bridge circuit is connected in parallel to the intermediate circuit and can be formed, e.g., be a so-called H-bridge or full bridge that has two parallel bridge legs connected to the intermediate circuit, each of which has two power semiconductor switches arranged in series therein. The bridge can also be a half bridge with two controllable power semiconductor switches that are connected in series. Each power semiconductor switch has an anti-parallel freewheeling diode assigned thereto. The power semiconductor switches are controlled in a suitable manner to produce an AC voltage at the connection points of the switches, for example. Conversely, AC voltage at the connection points of the switches can be converted into DC voltage to feed the intermediate circuit.

For high-power power converters, multiple such submodules are usually cascaded or chain linked, i.e. connected in series with one another to allow high rated system power in the megawatt range and high-voltage applications and to produce largely sinusoidal voltages with fine gradation. Such applications include static synchronous compensators (STATCOMs), which are voltage-source converter based compensation systems that improve the power quality of an electricity network or that compensate reactive power or harmonic content of loads, direct converter systems for railway power supply, high voltage direct current (HVDC) transmission systems and others. Redundancy requirements, according to which the function of a device must be ensured even when one or more submodules fail, can also require the use of multiple series-connected power converter submodules.

A failed submodule should not, to the extent possible, affect the functionality of the entire system. A fault can be caused by a damaged or destroyed power semiconductor switch, freewheeling diode or other semiconductor element of the bridge circuit or also by a failure in the driver unit of the power semiconductor switch. Various semiconductor switches are available for use. E.g., the submodules can be built using insulated-gate bipolar transistors (IGBTs) in so-called flat-pack or modular design that have multiple IGBT and anti-parallel diode chips on a substrate. Each chip is electrically connected through bond wires with the module-internal busbar. When a fault occurs, a fault current or overvoltage can cause an IGBT chip to break down and form a short circuit between its collector and its emitter connection. The defective chip then usually conducts the entire fault current, whose intensity and the overheating associated therewith can lead to the melting or tearing off of the bond wires within the microseconds range. This can result in arcing faults that can lead to an explosion of the IGBT module in question and other IGBT modules, and finally open the electric circuit of the entire submodule. This would interrupt the current in the series circuit of the submodules, which would have the consequence of shutting down the entire power converter. Such a scenario should be prevented. It is desired, when a fault occurs, to set up a long-term low-impedance current path between the AC voltage connections of the faulty submodule, to allow redundancy between the submodules and ensure the further functionality of the power converter or the entire system.

DE 103 23 220 A1 discloses a short-circuit circuit for a faulty power converter submodule having an internal intermediate circuit capacitor and a full-bridge circuit wherein each intermediate circuit capacitor has an electronic semiconductor device connected in parallel, which when a submodule fault occurs, either accepts a short circuit current of the intermediate circuit capacitor or, depending on such a short circuit current, is controlled and then permanently breaks down, or breaks down as a consequence of high surge currents through the discharge of the capacitor. The semiconductor device connected in parallel to the intermediate circuit capacitor can be a diode, a thyristor, or a power semiconductor switch, in particular, an IGBT. When a fault occurs, e.g., the thyristor is fired and the power semiconductor switches of the bridge circuit are controlled in such a manner that they desaturate and the short circuit current quickly commutates to the fired thyristor, which then breaks down and forms a durable short-circuited bypass path. Such a bypass path requires additional components and increases the complexity of the circuit.

It is also usual in practice today to provide so-called AC short-circuiters which are formed, for example, by fast-switching mechanical switches that are arranged in a bypass branch between the AC voltage connections of the submodule and are closed when a fault occurs to create a short circuit bypass path between the AC voltage connections. Here again, additional components are required for the bypass path.

DE 103 33 798 B4 describes a method of short-circuiting a faulty submodule of a power converter, wherein the submodule having a full-bridge circuit and at least one internal intermediate circuit capacitor as energy storage is connected in a series circuit of submodules. When a fault occurs, all power semiconductor switches are simultaneously controlled to provide a shoot-through fault through each leg of the submodule such that the capacitor then discharges through each submodule leg and the high short circuit current flowing through the power semiconductor switches causes them to permanently break down to create a durable short-circuit of the direct voltage side of the submodule. When a fault occurs, irrespective of the faulty device and the fault mode, all power semiconductor switches are destroyed resulting in the mechanical destruction of the entire submodule, which can be costly. There is also a risk of explosion of the power semiconductor switches and damage of other semiconductor elements and other submodules by the chain reaction caused by bursting off parts. Implementing the method so as to achieve, on the one hand, a quick breakdown of the power semiconductor switches and simultaneously avoid the formation of arcing faults and explosion of the submodule components can be very complicated and in many cases also difficult to achieve.

It is thus an object of the present invention to propose sophisticated and efficient measures that allow a submodule of a power converter with controllable power semiconductor switches to be bypassed with low effort when a fault occurs. In particular, it is an object of present invention to provide a method of short-circuiting a faulty full-bridge converter submodule which when there is a fault in the submodule, allows to set up a durable, stable, low-impedance short-circuit path between the AC voltage terminals of the submodule so that the long-term operation of the power converter and an entire power system can be continued. This is preferably achieved using low-complexity short-circuiting means while reducing the extent of damage to the submodule. In this regard, a shoot-through fault has to be omitted to reduce the likelihood of fault propagation to neighboring submodules.

Another object of the invention is to create a voltage-source power converter having multiple submodules connected in series and supporting such a method.

These and other objects of the present invention are achieved by a method of short-circuiting a faulty submodule for a power converter having the features of independent claim 1 and a voltage-source power converter supporting such a method as claimed in independent claim 15. Especially preferred embodiments of the present invention are defined in the dependent claims.

One aspect of the invention provides a method of short-circuiting a faulty submodule for a power converter, wherein the submodule comprises a bridge circuit and a capacitor. The bridge circuit includes at least one leg connected between first and second DC voltage nodes, each bridge leg including a controllable switching device connected in series to another controllable switching device or a non-controllable semiconductor valve. Each switching device includes a drivable power semiconductor switch connected in anti-parallel with a freewheeling diode. The capacitor is connected in parallel to the bridge circuit between the first and second DC voltage nodes and serves as a DC voltage intermediate circuit capacitor. The method comprises: detecting a fault in the submodule, identifying a faulty semiconductor device in the at least one bridge leg, determining a failure mode associated with the faulty semiconductor device, the failure mode selected from a short-circuit failure mode and an open circuit failure mode, selecting one or two power semiconductor switches as bypass device or devices in a selected bypass path between the first and second AC voltage terminals of the submodule depending on the identified faulty semiconductor device and the determined failure mode, and driving the one or two power semiconductor switches selected as the bypass device or devices by a modified driving voltage compared to normal operation to cause the selected one or two power semiconductor switches to break down in order to provide a durable, stable, low impedance short-circuit path between the first and second AC voltage terminals of the submodule.

According to the invention, based on the position and type of the faulty semiconductor device and the prevailing failure mode, only a single or maximum two particular power semiconductor switches are selectively destroyed to create a short-circuit (bypass) path which leads through the selected one or two bypass power semiconductor switches between the AC voltage terminals of the submodule and which can be permanently loaded with a rated current. This provides fail-safe functionality, as the current of the failed submodule can continue to flow. This is achieved using selected one of the power converter switches as the bypass device, which switches are present anyway and in normal operation are driven to be turned on and off so as to conduct and block the operating current, respectively. In all embodiments of the invention, the method does not require any additional bypass branches or any additional electronic or mechanical components to provide the short-circuit path other than those already present, thereby reducing the complexity of the circuit and the effort to design and control the components of the submodule and the power converter.

According to the applied procedure of the method, the one or two selected power semiconductor switches break down due to the modified driving voltage at the semiconductor's drive (gate) terminal and the normal nominal operating current flowing therethrough when they are driven into the conducting state. Short-through faults between the DC voltage nodes and excessive overcurrents due to shoot-through faults can be avoided thereby reducing the additional risk of arcing faults, explosion and further damages to other semiconductor components and other submodules due to chain reactions.

In preferred embodiments, the submodule may be a submodule of a voltage source converter (VSC), in particular, a modular multi-level converter (MMC), which includes a number of converter arms, each converter arm including a plurality of submodules connected in series and preferably an arm reactor, wherein a first AC voltage terminal of at least one submodule is electrically connected to a second AC voltage terminal of an adjacent submodule and wherein the converter arms are each connected between two AC voltage connections or between an AC and a DC voltage connection of the power converter, with the AC connection(s) being for connection to at least one phase line of a multi-phase power system. The converter arms may be connected in any of the configurations known in the art, including star, double-star, triple-star, delta, or combined configurations and others, to provide the desired MMC topology.

With the method of the present invention, the continuous operation of the voltage source converter without any interruption can be implemented. Optionally, a corresponding switch of a redundant submodule, if available, may be opened so that the faulty submodule can be replaced by the operation of the redundant submodule. In any case, the required terminal voltage of the faulty submodule can be compensated for by other submodules of the voltage source converter.

In some preferred implementations, the submodule may comprise a full-bridge circuit including two bridge legs connected in parallel, each bridge leg including two controllable switching devices connected in series, each controllable switching devices including a drivable power semiconductor switch connected in anti-parallel with a freewheeling diode. The connection points between the controllable switching devices in each bridge leg may define first and second AC voltage terminals of the submodule, respectively. The selecting and driving steps of the method may then include the following procedures: If the determined failure mode is a short-circuit failure mode, then the one power semiconductor switch which is positioned in the other bridge leg than the bridge leg including the faulty semiconductor device and is directly connected to the same DC voltage node as the faulty semiconductor device is selected as the single bypass device and is driven to cause it to break down. If the determined failure mode is an open circuit failure mode, then both the power semiconductor switches which are directly connected to the other DC voltage node than the faulty semiconductor device are selected as the bypass devices and are both driven to cause them to break down.

In other preferred implementations, the submodule may comprise an asymmetric (or reduced) full bridge including a first bridge leg comprising a series connection of a first controllable switching device and a first diode (a first non-controllable semiconductor valve) and a second bridge leg comprising a series connection of a second controllable switching device and a second diode (a second non-controllable semiconductor valve). The first and second diodes may be positioned in a bridge diagonal of the bridge circuit. The connection points between the controllable switching device and the diode in each bridge leg may define the respective first and second AC voltage connections of the submodule. The selecting and driving steps of the method may then include the following procedures: If the faulty semiconductor device is one of the first and second diodes and the determined failure mode is a short-circuit failure mode, then the one power semiconductor switch which is positioned in the other bridge leg than the bridge leg including the faulty semiconductor device and is directly connected to the same DC voltage node as the faulty semiconductor device is selected as the single bypass device and is driven to cause it to break down. If the faulty semiconductor device is a diode or a power semiconductor switch connected to one of the DC voltage nodes and the determined failure mode is an open circuit failure mode, then the power semiconductor switch which is directly connected to the other DC voltage node than the faulty semiconductor device is selected as the single bypass device and is driven to cause it to break down.

It should be noted that submodules comprising an asymmetric or reduced full bridge are mostly used as unidirectional switch modules in applications in which the current flows in only one direction between the AC connections during regular operation. Therefore, for these applications a stable, durable, low-impedance, unidirectional short-circuit path is set up.

In still another preferred implementations, the submodule may comprise a half-bridge circuit including one bridge leg including a first and a second controllable switching device connected in series. A first AC voltage terminal and a second AC voltage terminal of the submodule may be tapped on both sides of the first controllable switching device. The selecting and driving steps of the method may then include the following procedure: If the faulty semiconductor device is anyone of the freewheeling diode of the first controllable switching device, the power semiconductor switch of the second controllable switching device or the freewheeling diode of the second controllable switching device and the determined failure mode is anyone of the short-circuit or the open circuit failure mode, then the one power semiconductor switch of the first controllable switching device is selected as the single bypass device and is driven to cause it to break down.

In each of the before mentioned implementations and embodiments, determining an open circuit failure mode may include detecting one or more of: bond wire lift-off of a semiconductor device due to wear out or failure, loss of controllability of a driver unit for driving a controllable switching device; and/or loss of electrical connection of current carrying components like busbars, screws, cables, and the like. A loss of electrical connection corresponds to an open circuit failure mode and may be considered as a fault of a (nearest) semiconductor switch in the same bridge leg and may be associated therewith. Determining a short-circuit failure mode may include detecting that at least one of the semiconductor devices, i.e. the switches, freewheeling diodes and diodes, if present, failed into a short-circuit failure mode due to overvoltage, overcurrent or excess driving voltage.

In preferred embodiments, the power semiconductor switches are of a type selected from IGBT (insulated-gate bipolar transistor), IGCT (integrated gate-commutated thyristor), and GTO (gate turn-off thyristor). MOSFETs with external anti-parallel diodes and other comparable semiconductor elements that are suitable for the purposes of the present invention can also be used. The terms collector, emitter, and gate used herein relate to the preferred use of IGBTs as the power semiconductor switches of the full-bridge circuit, but the person skilled in the art will be familiar with the corresponding terms for connections or electrodes of other comparable types of semiconductor devices.

In advantageous implementations, the power semiconductor switches may be press-pack medium voltage or high voltage semiconductor devices. In contrast to so-called flat-pack, modular or wire-bonded devices where the IGBT and anti-parallel diode chips are formed on a substrate and each is electrically connected through bond wires with a module internal busbar and which may fuse and render modules open-circuit in the event of failure, the use of pressure contact in the press-pack design ensures that the device will have a short-circuit failure mode under fault conditions, i.e. the press-pack will fail to short circuit. In addition, in the event of high energy failure, their robust housings offer greater rupture resistance than the flat-pack modules. Thus, although the press-pack design is more complex and expensive, it may be very useful for ensuring that the faulty switching device forms a stable and low-impedance short circuit so as to ensure long-term short circuit stability and high housing breaking strengths. The high breaking strength effectively prevents parts or broken pieces from escaping out of the pressure contact housing when a fault occurs, which can also avoid damage to surrounding system components. The power converter or the system can continue to be operated for months or even years until the next scheduled service stop, at which the faulty switching device and the destroyed bypass device can then be replaced. All other switching devices of the full-bridge of the faulty submodule can be maintained and continue to operate.

In principle, the freewheeling diodes and the non-controllable semiconductor valves (e.g. diodes), if present, of the submodule might also have a modular or flat-pack design. Most open source failure modes can be handled by the method of the present invention. Preferably, the freewheeling diodes may also be designed as press-pack semiconductor devices. Then, it is also ensured that a fault occurring in a freewheeling diode and/or a diode will result in a breakdown of the diode creating a stable short-circuit therethrough.

The method may preferably further comprise turning off a short circuit in the faulty bridge leg if present. This may be achieved by turning off or opening the power semiconductor switch of the other switching device in the faulty bridge leg. In particular, all power semiconductor switches may first be or kept turned off to temporarily interrupt any short circuit current after a faulty switching device has been identified.

In addition, before or after the step of turning off the short circuit and/or the step of selecting the bypass device or devices, the method may preferably comprise deactivating the normal device protection, like short-circuit or overvoltage protection, used during normal operation in order to initiate a desired procedure for the destruction of the selected device or devices. In particular, a gate driver unit may disable respective protection thresholds for normal operation.

In some embodiments, a faulty switching device may be identified by monitoring the current flowing in the bridge legs. For example, when a power semiconductor switch is turned on and a short circuit current forms and is detected, then the immediately previously turned-on power semiconductor switch or its corresponding freewheeling diode may be identified as the faulty device. This allows for fast and reliable detection.

Various techniques for driving the selected bypass device to achieve breakdown thereof are possible. In some embodiments, the driving step may include driving the selected bypass device at a modified driving voltage (e.g. gate-emitter voltage) which is slightly above the threshold voltage for turning on the power semiconductor switch but significantly less than the driving voltage for turning on the power semiconductor switch in normal operation. The term "slightly" means approximately 0-5 V, preferably around 0-2 V, above the threshold value. Given a threshold value for turning on an IGBT of 6 V and a normal turn-on gate voltage of approximately 15 V, the IGBT may be driven with a gate voltage of approximately 6-8 V to quickly and reliably cause the short-circuit. In some embodiments, a gate voltage of approximately 10-11 V may be used.

The lowered driving (gate) voltage leads to desaturation of the device and operation in the active area resulting in destroying the device and consequently in the permanent short-circuit or bypass through the device. The transfer characteristic (transconductance, i.e. the steepness or ratio of the output current to the driving voltage) of the power semiconductor switch (e.g. IGBT) may be used to desaturate the power semiconductor switch at the rated current, wherein the normal current is adapted to the short-circuit level and in combination with the resulting high output voltage of the semiconductor switch (collector-emitter voltage) leads to a thermal destruction of the device. The operation range for the device destruction depends on the desaturation level.

According to another technique, the driving step may include driving the selected bypass device with an extremely high modified driving (e.g. gate-emitter) voltage exceeding the gate oxide limits of the device. "Exceeding the gate oxide limits" means a voltage above the maximum allowable electrical field strength of the gate oxide of the device. A highly increased gate-emitter voltage (e.g. beyond 60 V in case of IGBTs) applied to the selected device results in a gate-emitter breakdown. Due to the gate-emitter breakdown (in the case of semiconductor components controlled by a metal-oxide-semiconductor (MOS) layer, the oxide layer between the gate and the emitter is destroyed), a short circuit develops between the emitter and the collector so that the semiconductor switch is broken down and conducts permanently. The required high gate voltage can be provided by any suitable boost stage circuit, including a choke which may selectively discharge to the gate, for example.

According to still another technique, the driving step may include alternately switching the modified driving voltage between two different voltage levels around the threshold level without turning off the selected bypass device. In case of IGBTs, the selected bypass power semiconductor switch may be switched back and forth by alternately changing between the driving voltage levels of 5 V and 7 V (or 6 V and 8 V and the like), for example, to increase thermal loading of the bypass device while avoiding turn-off of the device to thereby prevent cooling down of the device. This also assists in the fast destruction of the selected bypass device.

According to yet another, preferable technique, the driving step may include alternately switching the modified driving voltage, which is directly applied to the control electrode (e.g. a gate of an IGBT) of the selected power semiconductor switch, by providing a predetermined driving voltage by a gate drive device alternately through two different high-ohmic driving (gate) resistors which may be arranged in the driving path between the gate drive device and the control electrode (gate) of the switch. The high-ohmic driving (gate) resistors are sized several times larger than the normal driving (gate) resistance and so as to keep the output voltage of the power semiconductor switch within a specified range between two output voltage limits within the active operating area of the power semiconductor switch. This may result in high switch conduction losses and high power dissipation finally leading to the thermal destruction of the power semiconductor switch.

According to yet another technique, the driving step may include turning off the selected bypass device under conditions with very high turn-off power losses designed to cause the selected bypass device to break down. The duration of such a turn-off operation is rather long, longer than a normal turn-off operation by a factor of at least 5 or 10, and may be at least 200 μs or even 500 μs, for example. In some implementations, a high turn-off resistor of more than 50 ohms or even more than 200 ohms and/or an additional gate-emitter capacitor, which is at least 10 times larger than the actual gate capacitance, may be inserted in the driving path. This will slow down the turn-off behavior or reduce the turn-off dynamics of the selected bypass device. The required power losses and resulting operating points can be reliably determined based on the power converter typology and the estimated operating conditions.

The above-mentioned driving techniques may be used alone or in any combination. In each case, a fast response to a fault in the full-bridge circuit to create the permanent short-circuit path, well below 10 ms, may be achieved due to the use of the power semiconductor switches as the bypass devices. Compared to mechanical switches, which have a response time of at least 10 ms, the response time of the method of the present invention can be reduced. In addition, only one device, i.e. one bypass power semiconductor switch, is intentionally destroyed and needs to be replaced. Since semiconductor elements for the desired medium or high voltage high power applications are very costly devices, the expense can be minimized. Still further, for the method of the present invention, additional components for the bypass path, additional electronics for driving and control, additional space, etc., are not required, which all contributes to reduced efforts and cost of implementation, tests, and operation.

In a preferred embodiment, the method may additionally comprise detecting a failure of a diver unit which is associated with a particular power semiconductor switch. A failure of a diver unit may be detected by detecting an open-circuit of a driven power semiconductor switch or lack of controllability of the switch, for example. The method may then include selecting both the power semiconductor switches which are directly connected to the other DC voltage node than the power semiconductor switch associated with the faulty driver unit as bypass devices and driving both the bypass devices to cause them to break down. Thus, a durable, stable, low-impedance short-circuit path may be also provided if a driver unit fails.

Another aspect of the invention provides a voltage-source power converter. The power converter has a number of converter arms, wherein each converter arm comprises two or more submodules connected in series. Each submodule comprises a bridge circuit including at least one bridge leg connected between first and second DC voltage nodes and each bridge leg includes a controllable switching device connected in series to another controllable switching device or a non-controllable semiconductor valve. Each switching device includes a drivable power semiconductor switch connected in anti-parallel with a freewheeling diode. A capacitor is connected in parallel to the bridge circuit between the first and second DC voltage nodes. First and second AC voltage terminals are tapped from the at least one bridge leg. The submodule further comprises at least one driver unit associated with the power semiconductor switches for turning them on and off. The submodules are electrically connected to each other by connecting a first AC voltage terminal of one submodule to a second AC voltage terminal of an adjacent submodule. The converter arms are connected to each other in a star or delta configuration and define AC voltage connections of the power converter for connection to phase lines of a multi-phase power system. The power converter further comprises a control device for controlling its operation, wherein the control device is configured, in cooperation with the at least one driver unit, to perform the method of short-circuiting (bypassing) a faulty submodule, as described above.

The power converter can support any of the above-mentioned embodiments of the method together with its advantageous effects. The power converter is especially suitable for use in a high voltage direct current (HVDC) transmission system or a high-power converter, and also when redundancy requirements must be met. In any case, the power converter is configured to short-circuit or bypass a faulty submodule between its AC terminals for a long time in a stable manner to allow the power converter to continue to operate.

Further details of advantageous embodiments of the present invention may be taken from the dependent claims, the drawings and the associated description. The invention is described below in greater detail by reference to the drawing, which shows exemplary embodiments of the invention that are not limiting in any way, wherein the same reference numbers are used in all figures to designate the same elements. In the figures:

Figure 1:
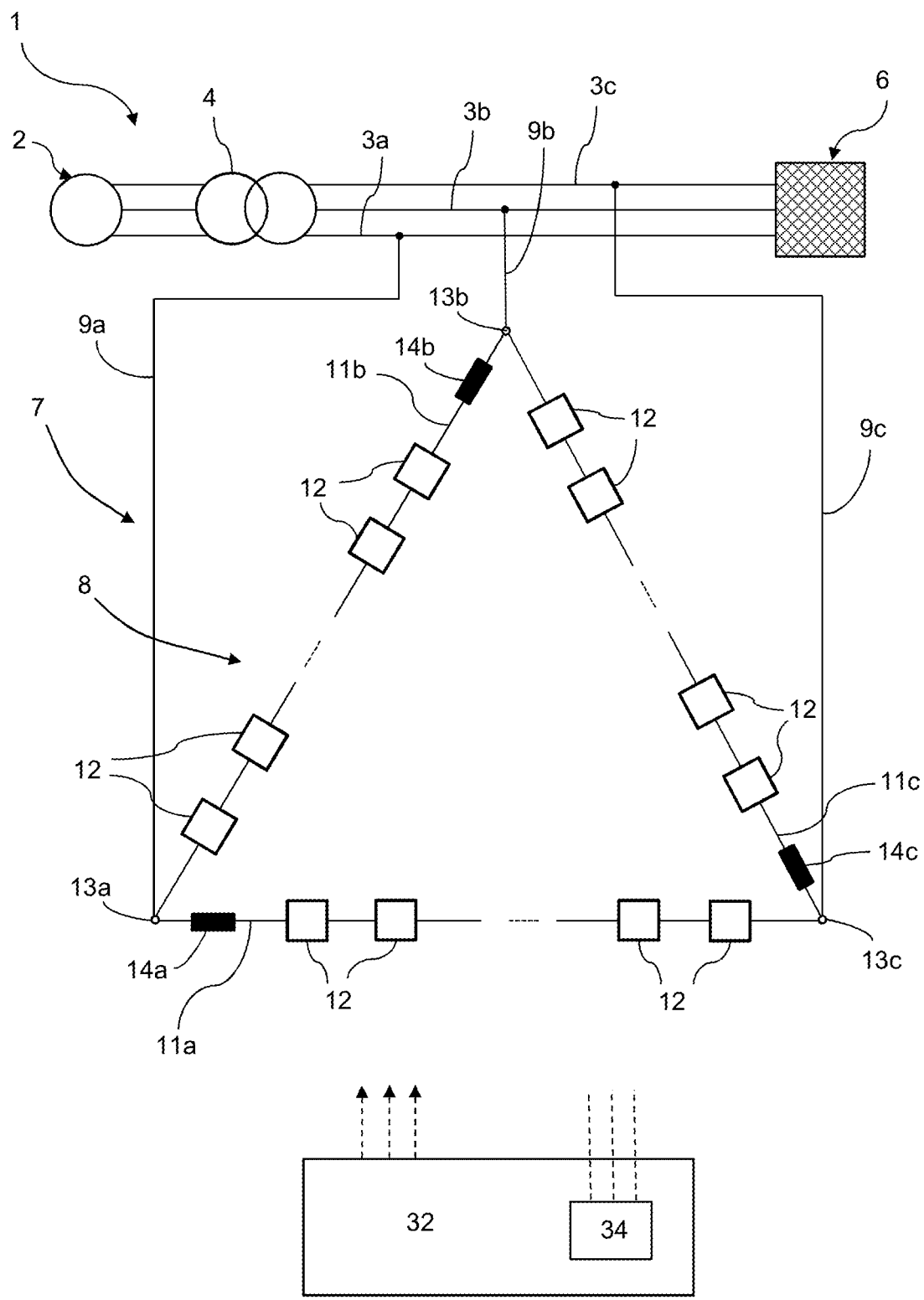
FIG. 1 is a block diagram of an exemplary system including a voltage-source power converter built of multiple submodules coupled to an electrical energy transmission network for providing reactive power compensation, to illustrate an exemplary application of the invention.

FIG. 1 shows a greatly simplified illustration of an electrical transmission system 1 that can be used for electrical power transmission for many other applications. The system 1 comprises here, e.g., a three-phase alternating current (AC) voltage source 2, which can be an electrical energy supply network, an electrical alternating current (AC) machine, an AC generator, a wind power plant, or the like. The AC voltage source is connected to three phase lines 3a, 3b, 3c via an optional transformer 4 which may transform the AC voltage provided by the voltage source 2 to suitable voltage levels for transmission. A unit schematically indicated by a block 6 in FIG. 1 is connected to the phase lines 3a, 3b, 3c to receive three-phase electrical power from the voltage source 2. The unit 6 may be another electrical energy supply network, an electrical AC machine or other three-phase load. In some applications, the unit 2 may be a power generation plant and the like and may transmit three-phase electrical power to the voltage source 2 which then acts as a power sink 2.

A voltage-source power converter (VSC) 8 is connected to the phase lines 3a, 3b, 3c via electrical conductors 9a, 9b, 9c. In the illustrated preferred application, the power converter 8 is part of a compensation system 7, the so-called static synchronous compensator (STATCOM), which is arranged to provide reactive power compensation for the electrical transmission system 1 for voltage stabilization or power factor enhancement or lowering the harmonic content of a particular load at the connection point.

In the exemplary embodiment shown in FIG. 1, the power converter 8 has three converter arms 11a, 11b, and 11c, which are connected nose to tail such that they form a triangular closed loop. This configuration is referred to as delta connection. The connection points of two of the converter arms 11a-c form respective AC voltage connections 13a, 13b, 13c of the power converter 8.

Each of the converter arms 11a-c is formed by a series circuit of multiple power converter submodules or modular switches 12 that are cascaded or chain linked, meaning that they are connected in series. Each converter arm 11a, 11b, 11c also includes an inductance 14a, 14b, and 14c, respectively, which can be provided by a reactor and facilitates generating or absorbing the reactive power. By operating the submodules or modular switches 12 according to a pulsed operation mode, the power converter may generate a suitable three-phase voltage system with variable voltage amplitude and a required phase shift at its AC voltage connections 13a, 13b, 13c to act as either a source or sink of reactive AC power to the electricity transmission system 1. The three-phase voltage is synthesized by the power converter 8 from an internal DC voltage source of the converter and can be dynamically changed through the switching states of the individual power converter submodules 12. The number of power converter submodules 12 determines the available number of voltage levels, which allow fine voltage gradation and a high-quality voltage waveform. The submodules 12 as such are explained in more detail below in connection with FIG. 2.

The chain linked power converter 8 is illustrated in FIG. 1 in the delta configuration. As an alternative, a so-called star or wye configuration may also be used. In the star/wye configuration either terminal of the three converter arms 11a-c of the power converter 8 is connected to a common point to form a Y like or star-shaped connection. In addition, while the voltage-source power converter 8 is shown and described herein as part of a reactive power compensation system 7, in other applications, the power converter 8 may also be used for direct converter systems for railway power supply, high voltage direct current (HVDC) transmission systems and other converter systems. The voltage-source power converter 8 having a plurality of series-connected submodules 12 is sometimes also called multilevel or multipoint converter. Generally, depending on the application and the required converter topology, the converter arms 11a-c having the multiple series-connected submodules 12 may be connected in any of the star, double-star, triple-star, delta, double-delta and other configurations currently known or developed in future.

Figure 2:
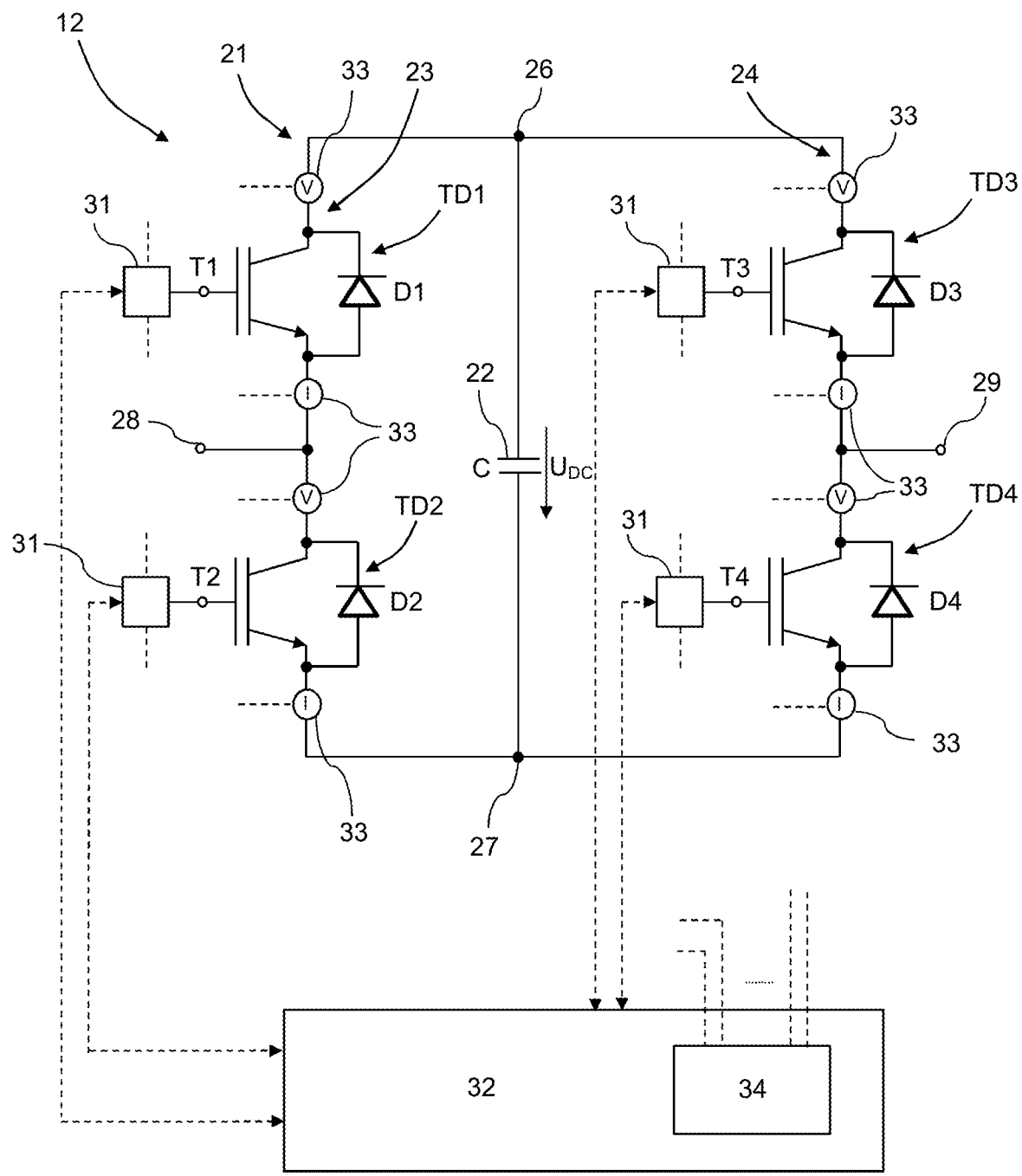
FIG. 2 shows a simplified circuit diagram of a first embodiment of a power converter submodule having a full-bridge topology that can be used in a modular or chain linked electrical converter, such as the power converter shown in FIG. 1, in accordance with the invention.

FIG. 2 shows a simplified circuit diagram of a known topology of a submodule or modular switch 12, which can be used in the chain-linked or multilevel power converter 8 of the type shown in FIG. 1 to implement the invention. The bidirectional submodule 12 shown in FIG. 2 has a bridge circuit 21 and a capacitor C, 22 which is connected in parallel to the bridge circuit 21. The bridge circuit 21 here is in the form of a so-called symmetrical H-bridge or full bridge with two parallel bridge legs 23, 24 that are connected parallel to one another between a first and a second DC voltage node 26, 27. The first bridge leg 23 has a series connection of a first power semiconductor switch T1 and a second power semiconductor switch T2, each of the first and the second power semiconductor switches T1, T2 being associated with freewheeling diodes D1 and D2, respectively, that are connected in anti-parallel. The freewheeling diodes D1, D2 serve to conduct operating current when power semiconductor switch T1 or T2 is opened and to protect the associated power switches against unacceptable overvoltages or reverse voltages.

Similarly, the second bridge leg 24 has a series connection of a third and a fourth power semiconductor switch T3, T4, each of which has a freewheeling diode D3 and D4, respectively, connected in anti-parallel thereto. The freewheeling diodes D3, D4 fulfill the same function as the freewheeling diodes D1, D2. The combination of a power semiconductor switch Ti and the corresponding freewheeling diode Di (i=1 . . . 4) is subsequently also referred to as a switching device TDi (i=1 . . . 4).

The power semiconductor switches T1-T4 are controllable switches, which are advantageously formed here by IGBTs (insulated-gate bipolar transistors). However, in principle, other transistors, such as, e.g., IGCTs (integrated gate-commutated thyristors), GTOs (gate turn-off thyristors), MOSFETs provided with external anti-parallel freewheeling diodes or other comparable switchable power semiconductor components could also be used. The terms collector, emitter, and gate electrode used herein relate to the preferred use of IGBTs as the power semiconductor switches T1-T4 of the bridge circuit 21. The person skilled in the art will be familiar with and commonly use other corresponding terms for connections or electrodes of other comparable semiconductor devices.

As is apparent from FIG. 2, the emitter of the first power semiconductor switch T1 is connected to the collector of the second power semiconductor switch T2, the connection point forming a first AC voltage terminal 28 of the submodule 12 that alternatively can be an input or output connection. Likewise, the emitter of the third power semiconductor switch T3 is connected to the collector of the fourth power semiconductor switch T4, the connection point forming a second AC voltage terminal 29 of the submodule 12 that alternatively can be an input or output connection.

The capacitor C is connected in parallel to the two parallel series circuits or bridge legs 23, 24 and serves as an energy storage 22. It can also be designated as a DC link capacitor of the submodule 12. The DC voltage $U_{dc}$ across the capacitor C is always positive due to the connection of the freewheeling diodes D1-D4 and can be, e.g., between several hundred volts and several kV, depending on its rating and application. The voltage between the AC terminals 28, 29 of the submodule 12 can assume essentially the values $-u_{dc}$, $+u_{dc}$, or 0. The DC voltage $u_{dc}$ across the capacitor C can become larger or smaller. A current can flow through the submodule 12 in both directions, that is from the terminal 28 to the terminal 29, or vice versa.

As may be further seen from FIG. 2, a driver unit (gate driver) 31 is associated with each of the IGBTs for turning them on and off. As is known in the art, the driver unit 31 accepts a low-power input from a higher-level control unit, such as the control device 32 shown in FIGS. 1 and 2, and produces a high-current drive input for the gate of the high-power semiconductor switch, such as the IGBT T1-T4 in present case. The driver unit 31 can be provided either on-chip together with the corresponding transistor or as a discrete module. A common driver unit 31 might be provided for all IGBTs T1-T4 of one submodule 12. The driver unit 31 serves as the interface between the control device 32 and the IGBTs or other power semiconductor switches T1-T4. The control unit 32 may be the control device for controlling operation of the power converter 8 of FIG. 1, which includes the series connection of submodules 12 shown in FIG. 2.

The submodule 12 may further include voltage and current sensing means 33 for sensing voltage potentials and current levels at various positions throughout the bridge circuit 21 of the submodule 12. In some embodiments, the driver unit 31 as such may be configured to measure the voltage across and/or current through the corresponding switch T1-T4 and to transmit the measured values to a monitoring unit 34 of the control device 32. In other embodiments, the monitoring unit 34 may be arranged to directly measure voltages and currents in the bridge circuit 21. In an alternative embodiment the current is measured at converter arm level and the states of the individual switches provide information about the current path within individual submodules. Hence, the measured voltage at the switches and the converter arm current measurement can replicate current flow through individual switches.

Figure 3:
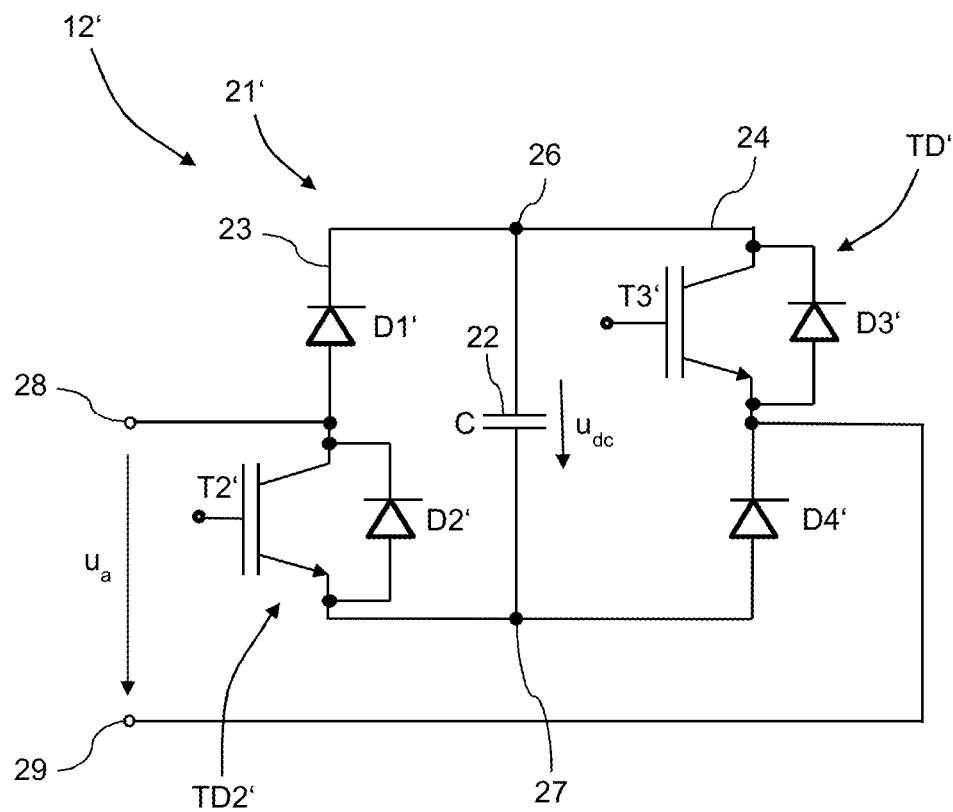
FIG. 3 shows a simplified circuit diagram of a second embodiment of a power converter submodule having a so-called reduced or asymmetrical full-bridge topology that can be used in a modular or chain linked electrical converter, such as the power converter shown in FIG. 1, in accordance with the invention.
Figure 4:
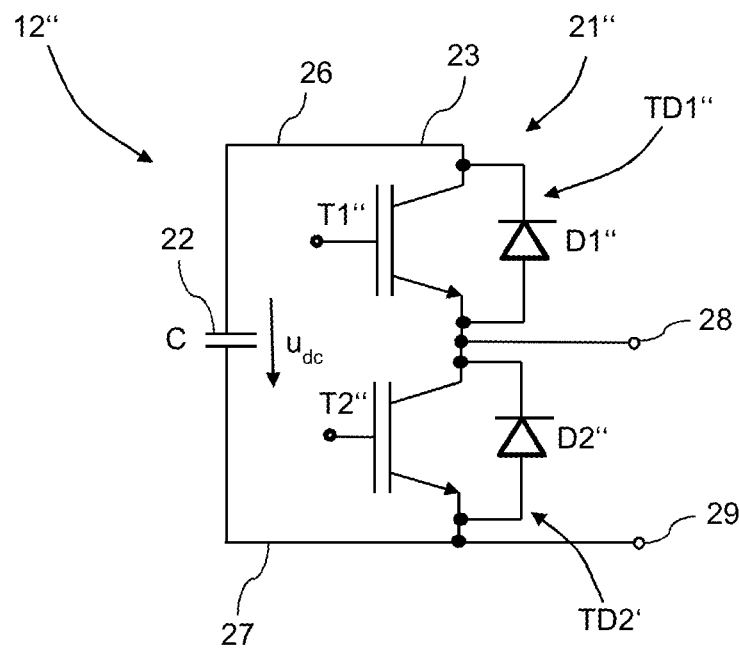
FIG. 4 shows a simplified circuit diagram of a third embodiment of a power converter submodule having a half-bridge topology that can be used in a modular or chain linked electrical converter in accordance with the invention.

FIGS. 3 and 4 show submodules 12' and 12" of other topologies which can be used in chain-linked or modular multilevel voltage-source power converters, such as the power converter 8 of FIG. 1, to practice the present invention. The submodule 12' shown in FIG. 3 is of a asymmetric or reduced H-bridge or full-bridge design which is a modified version of the submodule 12 of FIG. 2. Here the submodule 12' is formed by unidirectional switch modules in which the current flows in only one direction between the connections 28, 29 during regular operation. In contrast to the submodule 12 of FIG. 2, in FIG. 3, the power semiconductor switches T1 and T4 on a bridge diagonal of the bridge circuit 21' are omitted here such that each bridge leg 23, 24 has a series connection of a diode D1' and D4', respectively, and a controllable switching device TD2' and TD3', respectively. Each switching device TD2' and TD3' is formed by a power semiconductor switch T2' and T3', respectively, and a corresponding anti-parallel freewheeling diode D2' and D3', respectively. In other words, the controllable switching devices TD1 and TD4 are replaced by non-controllable semiconductor valves in the form of the diodes D1' and D4' on a bridge diagonal.

The AC voltage connections 28, 29 of the submodule 12' are defined at the connection points between the first diode D1' and the first switching device TD2' in the first bridge leg 23 and between the second switching device TD3' and the second diode D4' in the second bridge leg 24. During regular operation, the current through the submodule 12' always flows in the same direction determined by the diodes D1' and D4', namely in the direction from the first AC connection 28 to the second AC connection 29. Therefore, when the submodules 12' are connected in series in the power converter 8, care must be taken that the current flow direction is the same in all submodules. The voltage between the connections 28, 29 of the submodule 12' can assume essentially the three values $+u_{dc}$, $-u_{dc}$, and 0, where $u_{dc}$ is the voltage across the capacitor 22.

The submodule 12' of FIG. 3 may be further varied by interchanging the bridge diagonals. In other words, the second and the third power semiconductor switches T2, T3 (with associated freewheeling diodes D2, D3) of the submodule 12 shown in FIG. 2 can be replaced by non-controllable valves or diodes D2', D3' while the other controllable switching devices TD1 and TD4 are maintained. The result is again a unidirectional switch module, in which during regular operation the current flow is now determined by the diodes D2' and D3' and runs from the second submodule connection 29 to the first submodule connection 28. In other respects, the discussion concerning the submodule 12' applies here correspondingly.

The submodule 12" shown in FIG. 4 is of a half-bridge design. The submodule 12" thus includes a half-bridge circuit 21" which has only one bridge leg 23 including a first and a second controllable switching device TD1", TD2" connected in series. Each controllable switching device TD1", TD2" is formed by a power semiconductor switch T1" and T2"', respectively, and a corresponding anti-parallel freewheeling diode D1" and D2", respectively. A first AC voltage terminal 28 is tapped at the connection point of the first and second controllable switching devices TD1", TD2" and a second AC voltage terminal 29 of the submodule 12 is tapped at the connection point of the first switching device TD1" and the capacitor C, 22. In other words, the AC voltage terminals 28, 29 are tapped on both sides of the first controllable switching device TD1"

In FIGS. 3 and 4, the driver unit 31, the control device 32, the voltage/current sensing means 33 and the monitoring unit 34 are omitted for reason of simplicity and convenience only. It should be understood that these devices 31-34 are also used in connection with the submodules 12', 12" shown in FIGS. 3 and 4 and their corresponding description given above in connection with the submodule 12 also applies analogously to the submodules 12', 12".

The power semiconductor switches T1-T4, T1'-T4', T1", T2" of the submodules 12, 12', 12" are preferably all manufactured in a so-called press-pack design. In especially preferred embodiments, the freewheeling diodes D1-D4, D1'-D4', D1", D2" and the non-controllable valves or diodes D1'-D4' in the submodule 12' are also press-pack devices. In contrast to modular or so-called flat-pack or wire-bonded devices, which fuse and render modules open-circuit in the event of failure, the use of pressure contacts ensures that press-packs will fail to short-circuit. In addition, in the event of high energy failure, their robust housings offer greater rupture resistance than modular or flat-pack devices. Principally, flat-pack devices might be used as well, but press-pack devices are preferred due to their inherent short-circuit failure mode under faulty conditions.

In any case, a failed submodule 12, 12', 12" should not, to the extent possible, affect the functionality of the power converter 8 or even the entire power system 1. It is desired, when a fault occurs, to set up a long-term low-impedance current path between the AC voltage terminals 28, 29 of the faulty submodule 12, 12', 12", to allow redundancy between the submodules and ensure the further functionality of the converter 4 or the entire system 1. In order to achieve this, the present invention provides a method of short-circuiting a faulty submodule 12, 12', 12" for a power converter, such as the voltage-source converter 8 of FIG. 1. This method is described in more detail in connection with FIG. 5.

Figure 5:
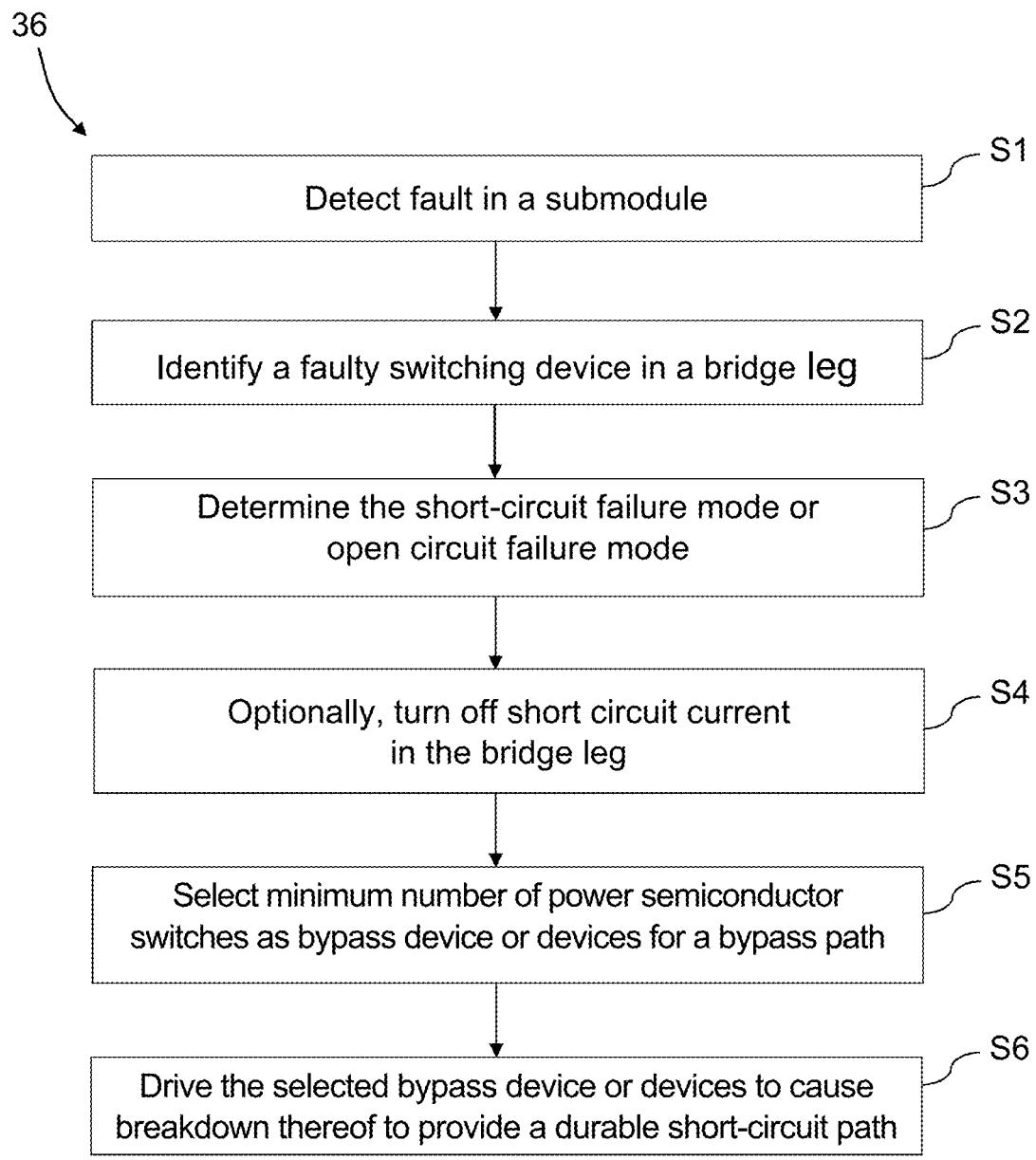
FIG. 5 shows a simplified block diagram of a method of short-circuiting a faulty power converter submodule according to the invention.

FIG. 5 shows a simplified block diagram of a method 36 of short-circuiting a faulty submodule for a power converter, such as the power converter 8 of FIG. 1. Obviously, the method may be used for a variety of power converter topologies which include the submodules 12, 12', 12" shown in FIGS. 2-4 and others. For convenience only, the following explanations are given with reference to the submodule 12 of FIG. 12 only, but they equally apply to the submodules 12', 12" of FIGS. 3, 4 and other similar submodules. Therefore, any reference to the submodule 12 should be understood as a reference to the submodules 12' and 12" and others as well.

In a first step S1, the method 36 includes detecting a fault in a submodule, such as the submodule 12, in the series connection of submodules of the power converter 8. In particular, a short-circuit current through a submodule or a wrong output voltage of the submodule may be detected.

Next, in step S2, the method 36 includes identifying a faulty switching device TDi (i=1 . . . 4) in one bridge leg 23 or 24. In addition, the failure mode associated with the faulty semiconductor device and selected from a short-circuit failure mode and an open circuit failure mode is determined in step S3.

For example, a short circuit through a power semiconductor switch T1 or the corresponding freewheeling diode Di (i=1 . . . 4) may be detected. As mentioned above, the power semiconductor switches T1-T4 and the corresponding freewheeling diodes D1-D4 are preferably of a press-pack design. Then, in case of a failure, they will fail to short circuit. The fault may be detected by the driver unit 31 and/or the monitoring unit 34 shown in FIGS. 1, 2 using the voltage and/or current sensing means 33. For example, if a switch, e.g. T2, in a bridge leg, e.g. 23, is turned on and a short-circuit current then forms and is detected by the driver unit 31 and/or the monitoring unit 34, then the immediately previously turned-on switch T1 or its corresponding freewheeling diode D1 in the same bridge leg, e.g. 23, may be identified as the faulty device.

If an open circuit occurs in a switching device, e.g. in case of flat-pack devices, this may be detected by a wrong collector-emitter voltage or a lack of current flow in the conducting state of an IGBT or through a freewheeling diode or a diverging capacitor voltage due to different current path through the submodule, for example.

Generally, determination of an open circuit failure mode may include detecting one or more of the following conditions or failures: a bond wire lift-off of a semiconductor device T1, Di due to wear out or failure, a loss of controllability of a driver unit 31 driving a controllable switching device TDi, and/or loss of electrical connection of current carrying components like busbars, screws, cables, etc. Determination of a short-circuit failure mode may include detecting that at least one of the semiconductor devices T1, Di failed into a short-circuit failure mode due to overvoltage, overcurrent or excess driving voltage $U_{GE}$.

Once a faulty switching device is identified and the failure mode is determined or known, then in the next optional method step S4, a short-circuit current in the faulty bridge leg 23, 24, if present, may be turned off. This may be achieved by turning off all active switches T1 in the short circuit current path by turning off the driving voltage $U_{GE}$ applied thereto. To this end, the driving voltages for all power semiconductor switches T1-T4 are reduced to a low level well below the threshold voltage $U_{th}$ for turning on the power semiconductor switch, such as well below zero. Thus, all switches T1-T4 of the submodule 12 are turned off or kept turned off.

Next, in the step S5, one or two power semiconductor switches T1 are selected as bypass device or devices in a selected bypass path between the first and second AC voltage terminals, such as the terminals 28, 29 of the submodule 12, depending on the identified faulty semiconductor device and the determined failure mode. In particular, the bypass path with the minimum number of power semiconductor which need to be shorted is selected.

For example, upon detection of a short circuit in a power semiconductor switch and/or a freewheeling diode positioned in one bridge leg (e.g. 23) in the submodule 12, the power semiconductor switch which is positioned in the other bridge leg (e.g. 24) than the one bridge leg including the faulty switching device and is directly connected to the same DC voltage node as the faulty switching device is selected as a suitable bypass device. A suitable bypass device is in this case that one which together with the faulty switching device may provide a short-circuit path through the common DC voltage node 26, 27 of the submodule 12.

Next, in step S6, the method 36 further includes driving the one or more power semiconductor switches selected as the bypass device or devices by a modified driving voltage compared to normal operation to cause the selected one or two power semiconductor switches to break down in order to provide a durable, stable, low impedance short-circuit path between the first and second AC voltage terminals, e.g. 28, 29, of the submodule, e.g. 12.

Various techniques for driving the selected bypass device to achieve breakdown thereof are possible. In preferred embodiments, the selected bypass device may be driven at a driving voltage $U_{GE}$ which is slightly above the threshold value $U_{th}$ for turning on the power semiconductor switch but significantly less than the driving voltage for turning on the power semiconductor switch in normal operation. In particular, the driving voltage $U_{GE}$ may be approximately 0-5 V, preferably around 0-2 V, above the threshold value $U_{th}$. Taking an IGBT as an example, the threshold value $U_{th}$ for turning on an IGBT is approximately 6 V and a normal turn-on gate voltage is approximately 15 V. The driving step S6 in the method 36 may include applying a gate voltage of approximately 6-11 V, preferably around 6-8 V, to quickly and reliably cause the short circuit. In other embodiments, a gate voltage of approximately 10-11 V may be used.

Figure 6:
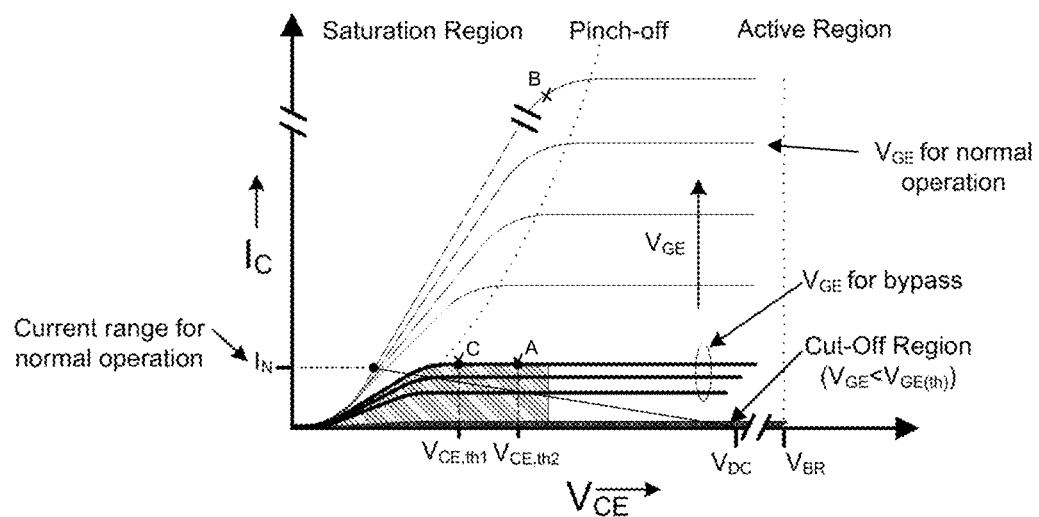
FIG. 6 shows an output characteristics diagram of an IGBT to demonstrate techniques of the method shown in FIG. 5.

Since the short circuit current is determined by the topology of the power converter and the respective application, the low driving (gate) voltage leads to desaturation of the device. In the output characteristics diagram of an IGBT, as shown in FIG. 6, which shows the collector current over the collector-emitter voltage for various gate-emitter voltages, this results in an operating point A in the active region of the output characteristic diagram, i.e. where the output characteristic curve shows a substantially flat horizontal shape. The operating point A is slightly above the cut-off or forward blocking region, which is indicated in FIG. 6 and in which the IGBT is turned off. The high collector-emitter voltage $U_{CE}$ in the operating point A leads to a high thermal loading on the IGBT which finally results in destroying the IGBT within a short time, less than 50 ms, or preferably in 10 ms. In this time, the IGBT will break down and, thus, fail to short circuit. This provides the durable, stable, low impedance short-circuit path between the AC voltage terminals 28, 29 of the submodule 12.

According to another technique, the driving step S6 in the method 36 of FIG. 5 may include driving the selected bypass device with an extremely high driving (e.g. gate-emitter) voltage $U_{GE}$ exceeding the gate oxide limits of the device. In other words, a driving voltage above the maximum allowable electrical field strength of the gate oxide of the device is applied. Given a gate-emitter voltage $U_{GE}$ and a thickness d of the gate oxide layer of the IGBT, the electrical field strength is given by $$E = \frac{U_{GE}}{d}.$$

The maximum allowable electrical field strength of an IGBT may be taken from the corresponding product specification of the manufacturer.

In case of IGBTs, a highly increased gate-emitter voltage may include a voltage beyond 60 V. For example, a gate-emitter voltage $U_{GE}$ in the range of 60-100 V, preferably 80-100V, when applied to the selected bypass device, will result in a quick gate-emitter breakdown of the IGBT, in which the oxide layer between the gate and the emitter is destroyed, within less than 10 ms. Due to the gate-emitter breakdown, a short circuit develops between the emitter and the collector so that the semiconductor switch will break down and conduct permanently. The required high gate voltage can be provided by a suitable boost stage circuit integrated into the driver unit 31, for example. A suitable operating point for this driving technique is indicated as B in the output characteristics diagram shown in FIG. 6.

According to still another technique, the driving step S6 of the method 36 shown in FIG. 5 may include alternately switching the driving voltage (gate-emitter voltage) $U_{GE}$ between two different voltage levels around the threshold level $U_{th}$ for turning on the power semiconductor switch without turning off the selected bypass switch. In the case of IGBTs, the selected bypass power semiconductor switch may be switched back and forth by alternately changing between the driving voltage levels of 5V and 7V or between 6V and 8V, for example. In the output characteristics diagram shown in FIG. 6, this may include switching between operating points that are limited through A and C, for example. Switching between such two voltage levels greatly increases power losses of the power semiconductor switch and the resulting thermal loading thereof. Since turn-off of the bypass device is avoided, cooling down of the device may be prevented. This greatly assists in the fast breakdown of the selected bypass device within a short period of less than 50 ms or even less than 10 ms.

According to yet another technique, the driving step S6 in the method 36 of FIG. 5 may include turning off the selected bypass device under conditions with very high turn-off power losses designed to cause the selected bypass device to break down. The required power losses and resulting operating points can be determined based on the type of power semiconductor switch used, the power converter topology and the estimated operating conditions.

The above-mentioned driving techniques may be used alone or in any combination.

Figure 7A:
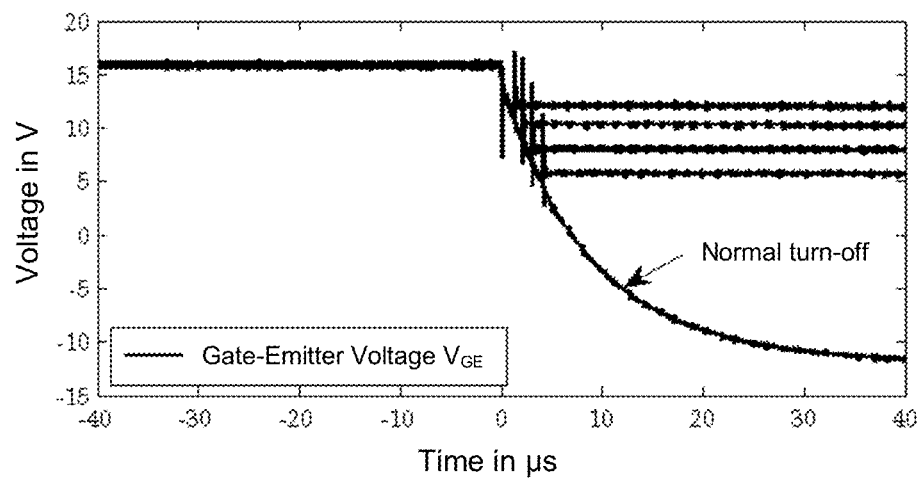
FIGS. 7a and 7b show time diagrams illustrating the gate-emitter voltage over time to demonstrate techniques of the method shown in FIG. 5.
Figure 7B:
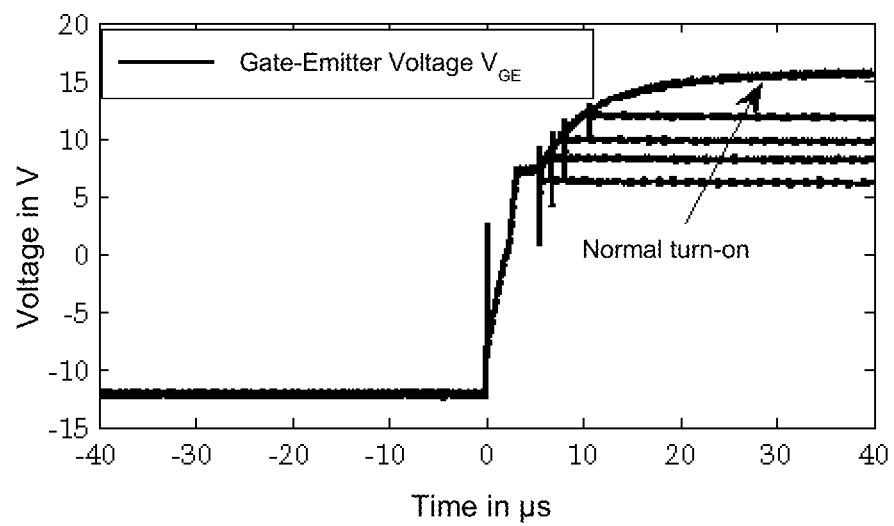

FIGS. 7a and 7b are time diagrams illustrating the gate-emitter voltage $U_{GE}$ over time to demonstrate some of the above-mentioned techniques for driving the selected bypass device into short circuit in the method 36 of FIG. 5. FIG. 7a shows the case, when the selected power semiconductor switch is already turned on and conducting current when a fault is detected and identified. Then the driving voltage (gate-emitter voltage $U_{GE}$ for IGBTs) for the selected bypass device or devices is switched to a modified level which is less than the normal driving voltage level for turning on the power semiconductor switch during normal operation (e.g. 15-16 V in the example shown in FIG. 7a), but higher than the normal driving voltage level for turning off the power semiconductor switch during normal operation (approximately −12 V in the example shown in FIG. 7a). In particular it is higher than the threshold value $U_{th}$ (approximately 6 V) for turning on the power semiconductor switch. In FIG. 7a, four exemplary modified driving voltage $U_{GE}$ levels are indicated to be approximately 5 V, 8 V, 10 V, and 12 V. In tests performed, these modified driving voltage levels have demonstrated the potential to effectively and quickly cause the IGBT to break down under assumed operating conditions.

FIG. 7b shows the case, when the selected power semiconductor switch is turned off and in a non-conducting state, when the fault occurs. Then the driving voltage $U_{GE}$ is switched from the normal turn-off level (e.g. −12 V) to the modified level which is higher than the threshold value $U_{th}$ for turning on the power semiconductor switch, but less than the normal driving voltage level for turning on the power semiconductor switch during normal operation. As explained before, the modified driving voltage $U_{GE}$ level may be approximately 5 V, 8 V, 10 V, or 12 V.

According to the preferred technique explained above in connection with FIG. 6, the driving voltage $U_{GE}$ may be alternately switched between two of the indicated modified driving voltage levels around the threshold level $U_{th}$ for turning on the power semiconductor switch without turning it off, such as between 5V and 8V or between 8V and 10V, for example. This will quickly bring the power semiconductor switch to break down and fail to short circuit.

Figure 8A:
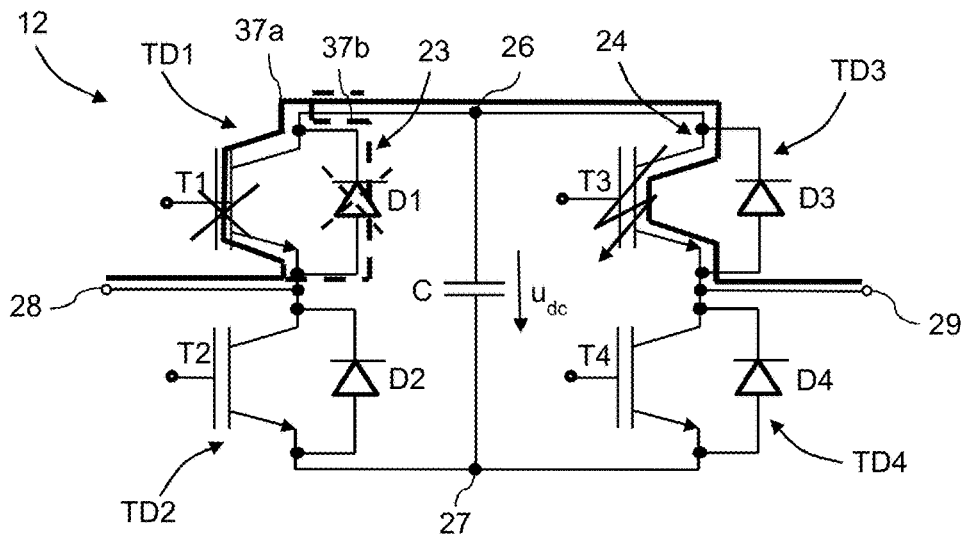
FIGS. 8a-8c show simplified circuit diagrams of the power converter submodule of FIG. 2, illustrating various bypass paths resulting from the application of the method of FIG. 5.
Figure 8B:
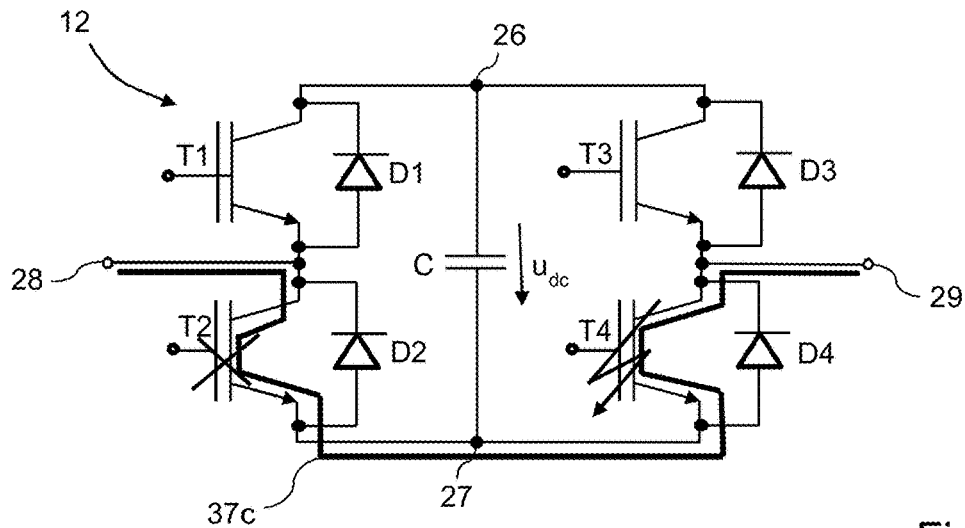
Figure 8C:
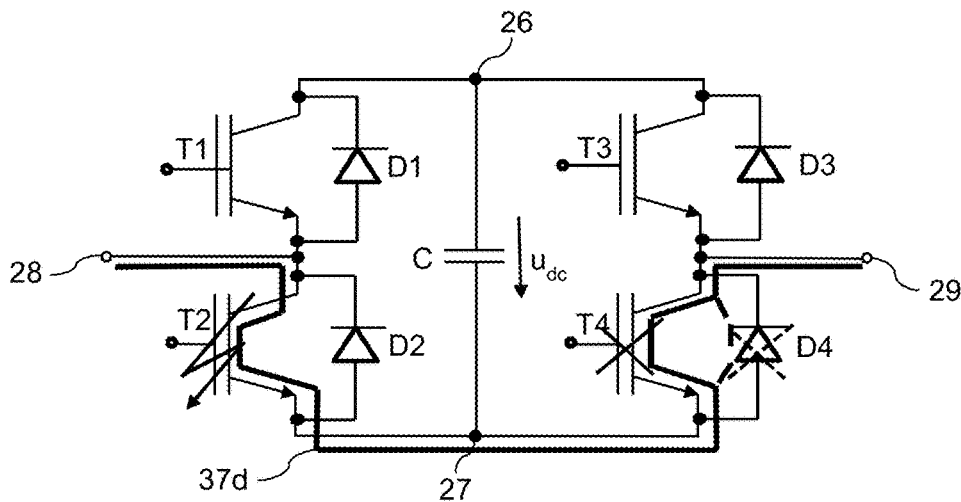

FIGS. 8a-8c show simplified circuit diagrams of the power converter submodule 12 of FIG. 2 illustrating various bypass paths resulting from the application of the method 36 shown in FIG. 5. FIG. 8a shows a case where a fault (short-circuit failure mode) has been identified in the power semiconductor switch T1 in the bridge leg 23 of the submodule 12. This is indicated by a cross shown over the switch T1. In this case, the power semiconductor switch T3, the collector of which is directly connected to the same DC voltage node 26 of the submodule 12 as the collector of the faulty switch T1 is selected as the designated single bypass device. The power semiconductor switch T3 is then driven by any of the driving techniques described above such that the switch T3 breaks down or, in other words, by destruction fails to short circuit. This is indicated by a lightning icon displayed over the power semiconductor switch T3. As a result, a durable, stable, low-impedance short-circuit path between the AC voltage terminals 28, 29 of the submodule 12 is created, which runs through the power semiconductor switches T1 and T3 and the DC node 26, as is indicated in FIG. 8a by a respective solid line 37a.

Substantially the same procedure applies if the freewheeling diode D1 is identified as the faulty device in the submodule 12. This is indicated by a dashed cross laid over the diode D1 in FIG. 8a. In this case, the power semiconductor switch T3, the collector of which is directly connected to the same DC voltage node 26 as the cathode of the diode D1, is selected as the single bypass device and driven to fail to short circuit. As a result, the durable, stable, low-impedance short-circuit path, which runs between the AC voltage terminals 28, 29 through the failed diode D1, the node 26 and the destroyed switch T3, is created.

FIG. 8b shows a case in which switch T2 is identified as the faulty device which failed to short-circuit. In this case, the switch T4, the emitter of which is directly connected to the same DC voltage node 27 as the emitter of the switch T2, is selected as the single bypass device and driven such that it fails to short-circuit. This creates a durable, stable, low-impedance short-circuit path 37c running between the AC voltage terminals 28, 29 through the switches T2 and T4 and the DC voltage node 27 of the submodule 12. The same switch T4 is also selected as the designated single bypass device and selectively destroyed if the freewheeling diode D2 fails.

FIG. 8c shows a case where a short-circuit in the power semiconductor switch D4 or the diode D4 is detected. Then, the power semiconductor switch T2, the emitter of which is directly connected to the same DC voltage node as the emitter of the switch D4 or the anode of diode D4, is selected as the designated single bypass device and driven such that it fails to short circuit. The resulting durable, stable, low-impedance short circuit path 37d runs between the AC voltage terminals 28, 29 through the defective switch T4 or diode D4, the DC voltage node 27 and the destroyed bypass device T2.

In each case, only one of the power semiconductor switches T1-T4 needs to be intentionally destroyed to create the durable, permanent short-circuit path and needs to be replaced. Since semiconductor elements for the desired high power applications are costly devices, the expenses can be minimized. Any additional components for the bypass path, additional trip assemblies, additional space, etc. are not required with the inventive method. This all contributes to reduced efforts and cost of implementation, tests, and operation. In addition, since the selected power semiconductor switch is destroyed by the modified driving voltage and a normal operating current, excessive overcurrents and the risks of arcing and damages associated therewith may be avoided. Moreover, a very fast response to a fault in the full-bridge circuit 21 to create the short-circuit path, well below 10 ms, may be achieved due to the use of the power semiconductor switches T1-T4 as the bypass devices. Compared to mechanical switches, the response time of the method 36 of the present invention can be reduced. The short circuit path created enables the control device 32 to operate the power converter 8 such that the faulty submodule can be compensated for by other submodules 12 of the power converter 8 to ensure continued operation of a power converter 8 without interruption.

Figure 9A:
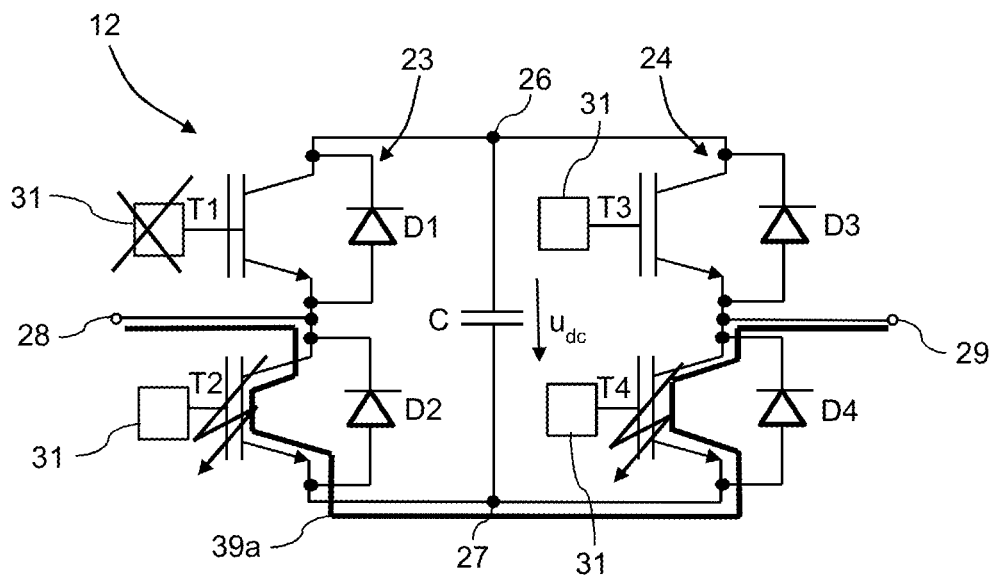
FIGS. 9a and 9b show simplified circuit diagrams of the power converter submodule of FIG. 2, illustrating other bypass paths resulting from the application of the method of FIG. 5.
Figure 9B:
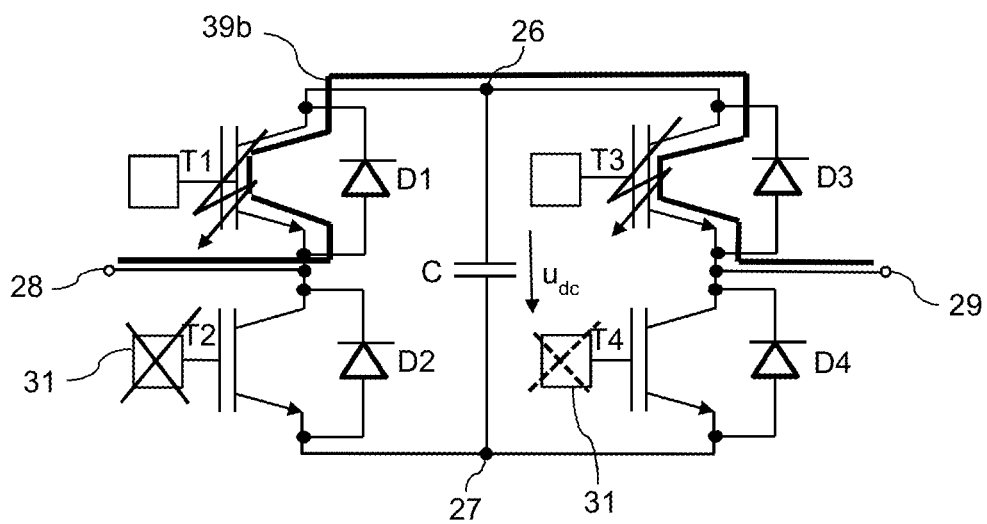

FIGS. 9*a* and 9*b* show simplified circuit diagrams of the power converter submodule 12 shown in FIG. 2, illustrating other bypass paths resulting from the application of the method of FIG. 5. These circuit diagrams illustrate the case when a faulty driver unit or an open-circuit is identified as the cause for the fault in the submodule. The semiconductor device which is associated with the faulty driver unit or has an open-circuit is subsequently referred to as the faulty semiconductor device. Such failures may be identified by detecting an open-circuit voltage over the faulty semiconductor device, lack of controllability of a faulty switch irrespective of the requested driving voltage or failure in or lack of communication between the driver unit 31 and the control device 32, for example.

The method 36 may then include selecting both power semiconductor switches which are directly connected to the other DC voltage node than the faulty semiconductor device as the bypass devices. For example, if the power semiconductor switch T1 connected to the DC voltage node 26, its corresponding freewheeling diode D1 or its associated driver unit 31 is identified as the faulty semiconductor device, as indicated by a cross laid over this driver unit 31 in FIG. 9*a*, then the power semiconductor switches T3 and T4 directly connected to the opposite DC voltage node 27 are selected as the designated bypass devices. The same applies if the other power semiconductor switch T3 directly connected to the DC voltage node 26 or its freewheeling diode D3 has an open circuit failure mode or its associated driver unit 31 fails.

If any of the driver units 31 associated with the switches T3 and T4 directly connected to the DC voltage node 27 fails, as is shown in FIG. 9*b*, then the power semiconductor switches T1 and T3 directly connected to the opposite DC voltage node 26 are selected as the designated bypass devices. The same applies when any the semiconductor devices T2, D2, T4, and D4 fails into an open circuit failure mode.

In all the explained cases, the selected bypass devices are driven using a suitable driving technique, as described above, to cause them to break down or, in other words, to be intentionally destroyed to fail to short circuit. Then a durable, stable, low impedance short-circuit path is created between the first and second AC voltage terminals 28, 29 of the submodule 12. In the failure case shown in FIG. 9*a*, this short-circuit path 39*a* runs through the lower two switches T2, T4 and the corresponding DC voltage node 27. In the failure case shown in FIG. 9*b*, the short-circuit path 39*b* runs through the upper two switches T1, T3 and the corresponding DC voltage node 26 of the submodule 12.

In the case of a failed driver unit 31 or an open circuit failure mode, only two of the power semiconductor switches T1-T4 need to be intentionally destroyed and need to be replaced. A durable, permanent short-circuit path may be created which allows for the continued operation of a power converter without interruption. Any additional components for the bypass path and corresponding auxiliary devices are not required.

In principle, the same techniques are also applied to the submodule 12', 12" configurations shown in FIGS. 3 and 4. In the case of the submodule 12' of FIG. 3, if the faulty semiconductor device is one of the first and second diodes D1' (or D3') and the short-circuit failure mode is determined, then the one power semiconductor switch T3' (T2'), which is positioned in the other bridge leg 24 (23) than the bridge leg 23 (24) including the faulty semiconductor device and is directly connected to the same DC voltage node 26 (27) as the faulty semiconductor device is selected as the single bypass device and driven such that it breaks down.

If the faulty semiconductor device is a diode D1' (D4') or a power semiconductor switch T3' (T2') connected to the DC voltage node 26 (27) and the open circuit failure mode is determined, then the power semiconductor switch T2' (T3'), which is directly connected to the other DC voltage node 27 (26) than the faulty semiconductor device is selected as the single bypass device and driven such that it breaks down.

Referring again to FIG. 4 and the submodule 12" of the half-bridge type shown therein, if the faulty semiconductor device is anyone of the freewheeling diode D1" of the first controllable switching device TD1", the power semiconductor switch T2" of the second controllable switching device TD2" or the freewheeling diode D2" of the second controllable switching device TD2" and the determined failure mode is either of the short-circuit or the open circuit failure mode, then the power semiconductor switch T1" of the first controllable switching device TD1" is always selected as the bypass device and driven such that it breaks down and creates the durable, stable, low impedance short-circuit path therethrough.

Figure 10:
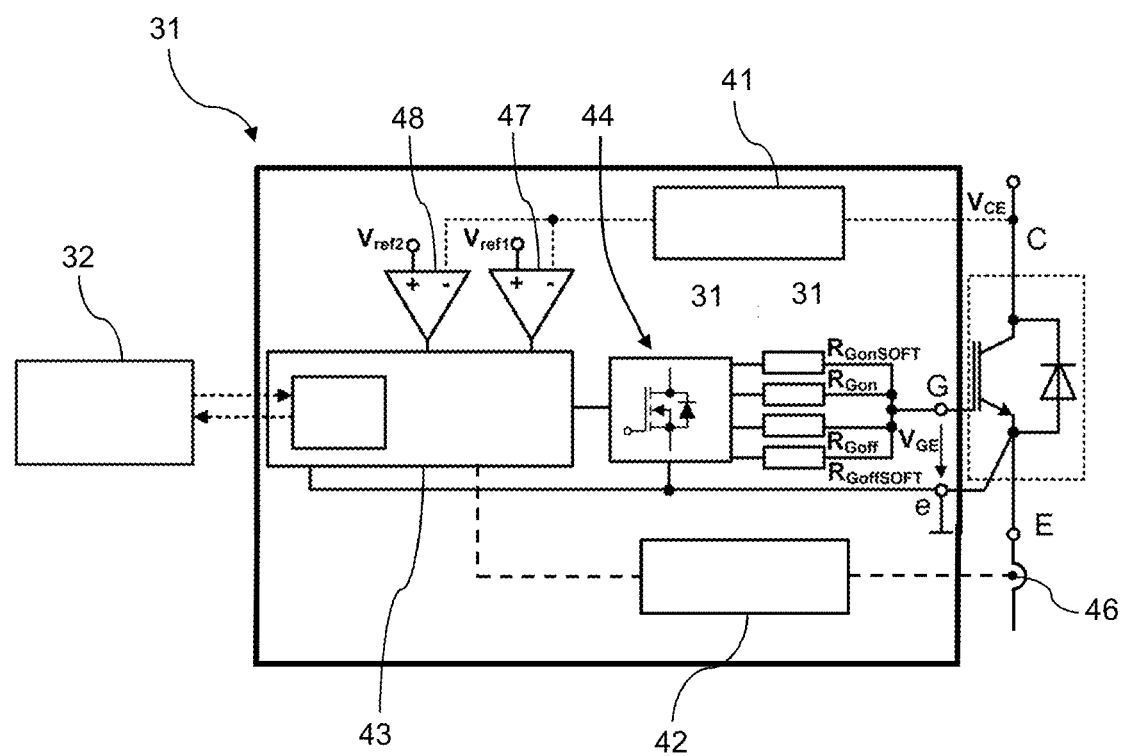
FIG. 10 shows a simplified circuit diagram of a driver unit for use with the submodule of any type shown in the FIGS. 2 through 4 for performing the method of FIG. 5.

Referring to FIG. 10, a simplified circuit diagram of a driver unit 31 for use with the submodule 12, 12', 12" of any type shown in the FIGS. 2 through 4 for performing the method of FIG. 5 according to an exemplary embodiment is shown. The driver unit 31 can be arranged in the immediate vicinity of the associated power semiconductor switch T, for example, on the same printed circuit board, on a common mounting frame or in some other way close thereto. The driver unit 31 may be in communication with the higher-level control device 32 in order to receive switch commands or control signals therefrom. The higher-level control device 32 can be positioned remote from the driver unit 31 and can be an external control.

As shown in FIG. 10, the driver unit 31 in the illustrated embodiment substantially comprises a voltage detection device 41, a current detection device 42, an evaluation device 43, and a gate drive device 44. Although the devices 41-44 are all shown to be present in the gate driver unit 31, all the devices 41-44 need not necessarily be provided together. They may also be distributed over various units, including the higher-level control device 32.

The voltage detection device 41 is used to detect voltage potentials at the collector connection C and optionally the gate connection G of the power semiconductor switch T relative to the emitter connection E or the internal emitter e of the gate driver unit 31, whose potential is used as the reference potential for the voltage measurements and to transmit voltage measurement signals indicative thereof to the evaluation device 43. The voltage detection can be performed directly at the respective connection, for example by means of a voltage divider. Alternatively, some voltages may be indirectly determined from other measured parameters in the circuit.

The current detection device 42 is configured to detect the load current through the power semiconductor switch T, which is the collector current $I_c$ here, which is equal to the emitter current $I_E$. A current sensor 46 is provided for current detection at the emitter connection E of the power semiconductor switch T. The current detection can also be determined by knowing the value of the parasitic inductance between the auxiliary and main emitter connection of the semiconductor power switch by integrating the measured voltage or with a voltage measurement on a shunt resistor.

The current detection device 36 sends a current signal that is indicative of the load/collector current $I_c$ to the evaluation device 43.

The voltage signals measured by the voltage detection device 41 are provided to a first and a second comparator 47 and 48 which each compare the received voltage signals to predetermined reference voltages $V_{ref1}$ and $V_{ref2}$, respectively, which are selected to allow to determine the current status of the power semiconductor switch T. The evaluation device 43 receives output signals of the comparators 47 and 48 and optionally measured current signals from the current detection device 42 as well as ON and OFF switch commands or other control signals from the control device 32 and evaluates these signals to instruct the gate drive device 38 to generate the respectively required gating signals for driving the power semiconductor switch T. Based on the received signal, the evaluation device 43 may be configured to detect an open circuit or short-circuit failure mode of the power semiconductor switch T. As an alternative, the evaluation device 43 may transmit the received signals to the higher-level control device 32 which may then determine a respective failure mode. The evaluation device 43 is preferably implemented using a programmable logic device, but may also be processor-based.

The evaluation device 43 is configured to cause the gate drive device 44 to switch the power semiconductor switch T on and off. The gate drive device 44 comprises suitable output stages for driving the gate G of the power semiconductor switch T. Depending on the prevailing operating or fault conditions, the evaluation device 43 is configured to cause the gate drive device 44 to apply different levels of the driving voltage $U_{GE}$ for turning the semiconductor switch T on and off and to bring it to break down. In order to achieve this, there is provided a bank of on and off resistors which are interposed between the gate drive device 44 and the gate G of the power semiconductor switch T and which may selectively be coupled into the path for driving the gate G of the power semiconductor switch T.

During normal operation, a first driving voltage level may be applied through the normal on resistor $R_{Gon}$ to turn on the power semiconductor switch T, while a second driving voltage level may be applied through the normal off resistor $R_{Goff}$ to turn it off. Under faulty conditions, when the power semiconductor switch T is turned off, while the fault occurs, then another on resistor $R_{GonSOFT}$ may be used to turn on the power semiconductor switch T with a modified driving voltage level which is only slightly higher than the threshold value $U_{th}$ for turning on the power semiconductor switch but significantly less than the driving voltage applied through the normal on resistor $R_{Gon}$ for turning on the power semiconductor switch in normal operation. This is also explained above in connection with FIG. 7b.

If the power semiconductor switch T is already turned on and conducting, while a fault occurs, then a still another resistor $R_{GonSOFT}$ may be used for driving the power semiconductor switch T with a modified driving voltage level which is less than the normal driving voltage level for turning on the power semiconductor switch during normal operation but is higher than the normal driving voltage level for turning off the power semiconductor switch during normal operation and is, in particular, higher than the threshold value $U_{th}$ for turning on the power semiconductor switch T. This is also explained above in connection with FIG. 7a.

As an alternative, in order to more effectively cause the power semiconductor switch T to break down and fail to short circuit, the gate drive device 44 may alternately switch between both the resistors $R_{GonSOFT}$ and $R_{GonSOFT}$ to alternately apply two different modified driving voltage levels at gate terminals, both around the threshold level $U_{th}$, without turning off the power semiconductor switch T.

Figure 11:
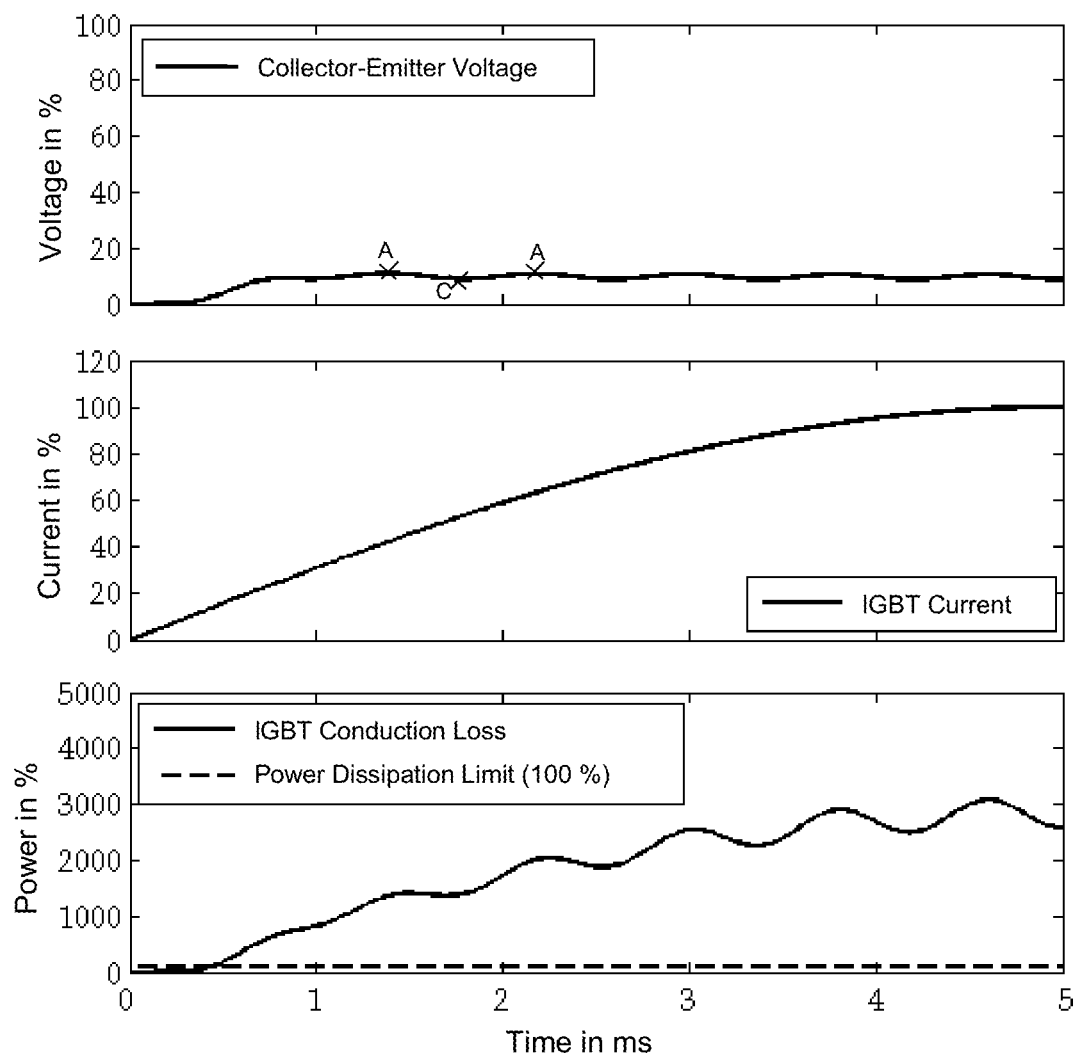
FIG. 11 shows simplified electrical waveforms of the collector-emitter voltage of the bypassing device, the converter arm current that presents the device current of the bypassing device and the dissipated power of the bypassing device for performing of the method of FIG. 5.

Referring to FIG. 11 in combination with FIG. 10, another embodiment of a particularly preferred method for the destruction of the power semiconductor switch or IGBT T to provide a stable, low impedance short-circuit path therethrough is shown in FIG. 11. After the determination of the at least one selected bypass device, such as according to step S5 in FIG. 5, the selected device is turned on to carry the converter arm current. Then, the control device 32 transmits a dedicated signal to the respective gate driver unit 31, which indicates that the associated switch T must be destroyed to bypass the submodule 12. The gate driver unit's control logic or micro-processing unit, i.e. the evaluation unit 43, receives the dedicated signal for device destruction and disables the protection thresholds for normal operation like short-circuit and overvoltage protection, for example. This procedure so far may be applied for any of the methods for the destruction of the power semiconductor switch or IGBT described above.

Once the normal protection thresholds are disabled, the first and second comparators 47 and 48 shown in FIG. 10 are activated to determine two voltage levels of the gate-collector voltage $U_{GC}$ that are used to operate the switch T within the active region according to FIG. 6 between operating points A and C. The switch T is then turned on and starts to carry the converter arm current, which is indicated as IGBT current in FIG. 11. The collector-emitter voltage $U_{CE}$ in FIG. 11 is kept within the specified range according to FIG. 6 through switching between two different gate-voltage $U_{GE}$ levels under consideration of the high turn-on resistance $R_{GonSOFT}$ and the high turn-off resistance $R_{GonSOFT}$ that are part of the circuit embodiment shown in FIG. 10. The high-ohmic gate resistors $R_{GonSOFT}$ and $R_{GonSOFT}$ support slowing down the semiconductor switching dynamics and keeping the switch T within the active area to avoid a sudden turn-off. It is important to note that the gate resistors $R_{GonSOFT}$ and $R_{GonSOFT}$ are selected to avoid turning off the switch T such that switch T becomes non-conductive.

Reaching the upper level of the collector-emitter voltage of point A in FIG. 11 (see also FIG. 6) is detected by the second comparator 48 for the upper threshold $V_{ref2}$ in FIG. 10. Then, the driver unit 31 provides the driving voltage for turning on the switch T through the gate resistance $R_{GonSOFT}$ to provide a higher gate-emitter voltage level of the modified driving voltage $U_{GE}$ directly applied to the gate G of the switch T. As a result, the collector-emitter voltage $U_{CE}$ will decrease down to the point where the first comparator 47 for the lower threshold $V_{ref1}$ in FIG. 10 detects reaching the lower threshold at point C in FIG. 11 (see also FIG. 6). At this point, the switch T is "switched off" through the high turn-off resistance $R_{GonSOFT}$ with the lower gate voltage level of the modified driving voltage $U_{GE}$ directly applied to the gate G of the switch T. The collector-emitter voltage $U_{CE}$ then starts to increase again up to the upper collector-emitter voltage threshold at point A in FIGS. 6 and 11.

The high-ohmic gate resistances $R_{GonSOFT}$ and $R_{GonSOFT}$ are several dimensions larger that the normal gate resistances (usually 1-3 ohms) and are at least 50 ohms (or even in the kilo ohm range) to ensure the IGBT switching dynamics are sufficiently slowed down to keep the device within the indicated active area in FIG. 6.

The method applies until the switch T finally breaks down and a short-circuit failure mode of this device is detected.

This detection can be done through the measurement of the gate-collector voltage $U_{GC}$, the gate-emitter voltage $U_{GE}$, the charges flowing into the gate G, for example. Then, the driver unit 31 will send a respective signal to the control device 32 that the switch T has been successfully destroyed, which is further used to validate on system level that the corresponding submodule 12 has reached the stable bypass state.

The example shown in FIG. 11 demonstrates that the on-state voltage of the switch T is kept in the range of approximately 10% of the average submodule voltage (intermediate circuit voltage of the submodule 12). Thus, the switch conduction loss in FIG. 11 is significantly higher compared to normal operation. The waveforms in FIG. 11 show that the power dissipation limit of the device package is exceeded by up to 30 times, which effectively leads to the thermal destruction of the semiconductor switch T due to high thermal excess and junction temperatures above the device limits. As a result, the switch T creates a reliable short circuit which may be determined by the driver unit 31 detecting that the gate-emitter voltage or the gate-collector voltage falls below certain threshold values. a. A method 36 of short-circuiting a faulty submodule 12, 12', 12" for a voltage-source power converter 8 is disclosed. The submodule 12, 12', 12" is based on a full-bridge, asymmetric full-bridge or half-bridge circuit design having power semiconductor switches T1-T4 with anti-parallel freewheeling diodes D1-D4 and optionally non-controllable semiconductor valves D1'-D4'. The method 36 includes identifying a faulty semiconductor device and determining a failure mode selected from a short-circuit failure mode and an open circuit failure mode. The method further includes selecting a minimum number of power semiconductor switches suitable to provide a bypass path through the submodule depending on the identified faulty semiconductor device and the determined failure mode and driving the selected power semiconductor switches by a modified driving voltage compared to normal operation to cause them to break down in order to provide a durable, stable, low impedance short-circuit path 37a-37d between the AC voltage terminals 28, 29 of the submodule 12, 12', 12". A power converter 8 comprising a series connection of such submodules 12, 12', 12" and supporting the method 36 of short-circuiting a faulty submodule 12, 12', 12" is also disclosed.

The invention claimed is:

1. A method of short-circuiting a faulty submodule for a power converter, the submodule comprising: a bridge circuit including at least one bridge leg connected between first and second DC voltage nodes, each bridge leg including a controllable switching device connected in series to another controllable switching device or a non-controllable semiconductor valve, each switching device including a drivable power semiconductor switch connected in anti-parallel with a freewheeling diode, a capacitor connected in parallel to the bridge circuit between the first and second DC voltage nodes, and first and second AC voltage terminals tapped from the at least one bridge leg, wherein the method comprises:
  detecting a fault in the submodule;
  identifying a faulty semiconductor device in the at least one bridge leg;
  determining a failure mode associated with the faulty semiconductor device, the failure mode selected from a short-circuit failure mode and an open circuit failure mode;
  selecting one or two power semiconductor switches as bypass device or devices in a selected bypass path between the first and second AC voltage terminals of the submodule depending on the identified faulty semiconductor device and the determined failure mode; and
  driving the one or two power semiconductor switches selected as bypass device or devices by a modified driving voltage compared to normal operation to cause the selected one or two power semiconductor switches to break down in order to provide a durable, stable, low impedance short-circuit path between the first and second AC voltage terminals of the submodule.

2. The method of claim 1, wherein the submodule is a submodule of a voltage-source power converter which includes a number of converter arms, each converter arm including a plurality of submodules connected in series, wherein a first AC voltage terminal of at least one submodule is electrically connected to a second AC voltage terminal of an adjacent submodule and wherein the converter arms are each connected between an AC voltage connection and another AC voltage connection or a DC voltage connection of the power converter.

3. The method of claim 1, wherein the submodule comprises a full-bridge circuit including two bridge legs connected in parallel, each bridge leg including two controllable switching devices connected in series, each controllable switching devices including a drivable power semiconductor switch connected in anti-parallel with a freewheeling diode, wherein the connection points between the controllable switching devices in each bridge leg define first and second AC voltage terminals of the submodule, respectively, wherein the selecting and driving steps include:
  if the determined failure mode is a short-circuit failure mode: then selecting the one power semiconductor switch which is positioned in the other bridge leg than the bridge leg including the faulty semiconductor device and is directly connected to the same DC voltage node as the faulty semiconductor device as the bypass device; and driving the one power semiconductor switch selected as the bypass device to cause it to break down; and
  if the determined failure mode is an open circuit failure mode: then selecting both the power semiconductor switches which are directly connected to the other DC voltage node than the faulty semiconductor device as the bypass devices and driving both the bypass devices to cause them to break down.

4. The method of claim 1, wherein the submodule comprises an asymmetric full bridge including a first bridge leg comprising a series connection of a first controllable switching device and a first diode and a second bridge leg comprising a series connection of a second controllable switching device and a second diode, wherein the first and second diodes are positioned in a bridge diagonal of the bridge circuit, and wherein the connection points between the controllable switching device and the diode in each bridge leg define the respective first and second AC voltage connections of the submodule, wherein the selecting and driving steps include:
  if the faulty semiconductor device is one of the first and second diodes and the determined failure mode is a short-circuit failure mode: then selecting the one power semiconductor switch which is positioned in the other bridge leg than the bridge leg including the faulty semiconductor device and is directly connected to the same DC voltage node as the faulty semiconductor device as the bypass device; and driving the selected bypass device to cause it to break down; and if the faulty semiconductor device is a diode or a power semiconductor switch connected to one of the DC voltage nodes and the determined failure mode is an open circuit failure mode: then selecting the power semiconductor switch which is directly connected to the other DC voltage node than the faulty semiconductor device as the bypass device; and driving the selected bypass device to cause it to break down.

5. The method of claim 1, wherein the submodule comprises a half-bridge circuit including one bridge leg including a first and a second controllable switching device connected in series, wherein a first AC voltage terminal and a second AC voltage terminal of the submodule are tapped on both sides of the first controllable switching device, wherein the selecting and driving steps include:
if the faulty semiconductor device is anyone of the freewheeling diode of the first controllable switching device, the power semiconductor switch of the second controllable switching device or the freewheeling diode of the second controllable switching device and the determined failure mode is anyone of the short-circuit or the open circuit failure mode: then selecting the one power semiconductor switch of the first controllable switching device as the bypass device; and driving the selected bypass device to cause it to break down.

6. The method of claim 1, wherein determining an open circuit failure mode includes detecting one or more of: bond wire lift-off of a semiconductor device, loss of controllability of a driver unit for driving a controllable switching device; and/or loss of electrical connection of current carrying components; and
wherein determining a short-circuit failure mode includes detecting that at least one of the semiconductor devices failed into a short-circuit failure mode due to overvoltage, overcurrent or excess driving voltage.

7. The method of claim 1, wherein at least all the power semiconductor switches are press-pack medium voltage or high voltage semiconductor devices which have a short-circuit failure mode under fault conditions.

8. The method of claim 1, wherein all the freewheeling diodes and the non-controllable semiconductor valves, if present, are designed as press-pack semiconductor devices.

9. The method of claim 1, further comprising turning off a short circuit current in the faulty bridge leg.

10. The method of claim 1, wherein when a power semiconductor switch is turned on and a short circuit current is detected, then the immediately previously turned on power semiconductor switch or its corresponding freewheeling diode is identified as the faulty device.

11. The method of claim 1, wherein the driving step includes driving the selected bypass device with a modified driving voltage which is slightly above the threshold voltage for turning on the power semiconductor switch but significantly below the normal driving voltage for turning on the power semiconductor switch.

12. The method of claim 1, wherein the driving step includes driving the selected bypass device with an extremely high modified driving voltage exceeding the gate oxide limits of the device.

13. The method of claim 1, wherein the driving step includes alternately switching the modified driving voltage between two different voltage levels around the threshold voltage for turning on the power semiconductor switch without turning off the selected bypass device.

14. The method of claim 1, wherein the driving step includes alternately switching the modified driving voltage directly applied to the control electrode of the selected power semiconductor switch by providing a driving voltage alternately through two different high-ohmic driving resistors to keep the output voltage of the power semiconductor switch within a specified range within the active operating area of the power semiconductor switch providing high switch conduction losses.

15. The method of claim 1, wherein the driving step includes turning off the selected bypass device under conditions with very high turn-off power losses designed to cause the selected bypass device to break down.

16. A voltage-source power converter, comprising:
a number of converter arms, each converter arm comprising two or more submodules connected in series, each submodule comprising:
a bridge circuit including at least one bridge leg connected between first and second DC voltage nodes, each bridge leg including a controllable switching device connected in series to another controllable switching device or a non-controllable semiconductor valve, each switching device including a drivable power semiconductor switch connected in anti-parallel with a freewheeling diode, a capacitor connected in parallel to the bridge circuit between the first and second DC voltage nodes, and first and second AC voltage terminals tapped from the at least one bridge leg,
at least one driver unit associated with the power semiconductor switches for turning them on and off;
wherein the submodules are electrically connected to each other by connecting a first AC voltage terminal of one submodule to a second AC voltage terminal of an adjacent submodule; and
wherein the converter arms are each connected between an AC voltage connection and another AC voltage connection or a DC voltage connection of the power converter; and
a control device for controlling operation of the power converter and configured, in cooperation with the at least one driver unit, to perform the method of short-circuiting a faulty submodule according to any of the preceding claims.

* * * * *